(12) United States Patent
Gea Aguilera et al.

(10) Patent No.: US 12,371,152 B2
(45) Date of Patent: Jul. 29, 2025

(54) AERONAUTICAL THRUSTER

(71) Applicant: SAFRAN AIRCRAFT ENGINES, Paris (FR)

(72) Inventors: Fernando Gea Aguilera, Moissy-Cramayel (FR); Anthony Binder, Moissy-Cramayel (FR); Adrien Clément Marcel Dubois, Moissy-Cramayel (FR); Mathieu Simon Paul Gruber, Moissy-Cramayel (FR); Norman Bruno André Jodet, Moissy-Cramayel (FR); Eva Julie Lebeault, Moissy-Cramayel (FR); Josselin David Florian Regnard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/577,064

(22) PCT Filed: Jul. 4, 2022

(86) PCT No.: PCT/FR2022/051321
§ 371 (c)(1),
(2) Date: Jan. 5, 2024

(87) PCT Pub. No.: WO2023/281192
PCT Pub. Date: Jan. 12, 2023

(65) Prior Publication Data
US 2024/0308647 A1    Sep. 19, 2024

(30) Foreign Application Priority Data
Jul. 6, 2021 (FR) .................................. 2107315

(51) Int. Cl.
*B64C 11/48* (2006.01)
*B64C 11/04* (2006.01)
*B64C 11/20* (2006.01)

(52) U.S. Cl.
CPC .............. *B64C 11/48* (2013.01); *B64C 11/04* (2013.01); *B64C 11/20* (2013.01)

(58) Field of Classification Search
CPC ......... B64C 11/48; B64C 11/04; B64C 11/20; B64D 2027/005; F01D 7/00; F01D 9/04
See application file for complete search history.

(56) References Cited

U.S. PATENT DOCUMENTS

| 2013/0315701 | A1* | 11/2013 | Neuteboom | ............ | F01D 9/041 |
| | | | | | 415/209.1 |
| 2014/0308124 | A1* | 10/2014 | Moore | .................... | B64C 11/48 |
| | | | | | 416/34 |

(Continued)

FOREIGN PATENT DOCUMENTS

FR  3081435 A1    11/2019
FR  3083207 A1 *  1/2020

(Continued)

OTHER PUBLICATIONS

International Search Report (with English translation) mailed Oct. 6, 2022, issued in corresponding International Application No. PCT/FR2022/051321, filed Jul. 4, 2022; 5 pages.

(Continued)

*Primary Examiner* — Courtney D Heinle
*Assistant Examiner* — Eric A Lange
(74) *Attorney, Agent, or Firm* — CHRISTENSEN O'CONNOR JOHNSON KINDNESS PLLC

(57) ABSTRACT

An aeronautical thruster having a longitudinal axis and having a hub and at least two annular rows of unducted blades including an upstream annular row and a downstream (Continued)

annular row which are spaced apart from one another along the longitudinal axis, the upstream annular row being rotatable around the longitudinal axis, and the downstream annular row comprising a series of blades including a first blade and a second blade each extending in a radial direction from the hub to define a radial dimension between the hub and a radially outer end of the corresponding blade, wherein the radial dimension of the first blade is greater than the radial dimension of the second blade.

19 Claims, 13 Drawing Sheets

(56) References Cited

U.S. PATENT DOCUMENTS

| | | | | |
|---|---|---|---|---|
| 2015/0147181 | A1* | 5/2015 | Henze | B64C 11/18 |
| | | | | 416/215 |
| 2017/0274993 | A1 | 9/2017 | Beckman et al. | |
| 2017/0369153 | A1* | 12/2017 | Vion | F01D 7/00 |
| 2021/0222575 | A1* | 7/2021 | Breeze-Stringfellow | F01D 25/12 |

FOREIGN PATENT DOCUMENTS

| | | |
|---|---|---|
| WO | 2012010782 A1 | 1/2012 |
| WO | 2016097635 A1 | 6/2016 |

OTHER PUBLICATIONS

Written Opinion (with English translation) mailed Oct. 6, 2022, issued in corresponding International Application No. PCT/FR2022/051321, filed Jul. 4, 2022; 9 pages.

* cited by examiner

AERONAUTICAL THRUSTER

CROSS-REFERENCE TO RELATED APPLICATIONS

This application is a National Stage of International Application No. PCT/FR2022/051321, filed Jul. 4, 2022, which claims priority to French Patent Application No. 2107315, filed Jul. 6, 2021, the entire disclosures of which are hereby incorporated by reference in their entirety for all purposes.

TECHNICAL FIELD

This disclosure relates to the field of aeronautical thrusters having a longitudinal axis, each comprising a hub and (at least) two annular rows of unducted blades, one upstream and the other downstream along the longitudinal axis.

In accordance with the above and what follows, the relative qualifiers "upstream" and "downstream" are defined in relation to each other throughout the text in reference to the flow of gases in the turbomachine along the longitudinal direction (i.e. the direction of the longitudinal axis).

The aeronautical thruster may comprise (at least) a heat engine, in particular a turbomachine, turboshaft engine, turbojet engine, or turbofan engine, and/or (at least) an electric motor, and/or (at least) a hydrogen engine, and/or (at least) a hybrid engine: thermal and/or electric and/or hydrogen.

PRIOR ART

Reference is made below more particularly, and therefore on a non-limiting basis, to the case of turbomachines, since the type(s) of engine comprised in the thruster is not a determining factor here. Turbomachine is understood to mean a thruster in which there is an exchange of energy between a flowing fluid and a rotor.

In this context, as an example one will recall that a turbomachine with an unducted fan ("propfan" or "open rotor" or "contra-rotating open rotor" type) is a type of turbomachine in which the fan (or propeller) extends outside the engine casing (or nacelle), unlike conventional turbomachines (turbofan type) in which the fan is ducted. An example of such a turbomachine is shown in FIGS. 1 and 2. Turbomachine 10 comprises a hub 12, defining the engine casing, and on which is mounted an upstream annular row 14 of unducted blades 18 and a downstream annular row 16 of unducted blades 18 which are spaced apart from one another along a longitudinal axis X of turbomachine 10. Orientation qualifiers, such as "longitudinal", "radial", or "circumferential", are defined in reference to the longitudinal axis X of turbomachine 10. Relative qualifiers "upstream" and "downstream" are defined in relation to each other in reference to the flow of gases in turbomachine 10 along the longitudinal axis X. Furthermore, turbomachine 10 comprises, from upstream to downstream inside the engine casing, one (or more) compressor(s) 2, at least one combustion chamber 4, one (or more) turbine(s) 6, and at least one exhaust nozzle 8.

Among these turbomachines with an unducted fan, there are the known "Unducted Single (or Stator) Fan" (USF) type of turbomachines in each of which, as illustrated in FIGS. 1 and 2, upstream annular row 14 of unducted blades 18 is mounted to be rotatable around the longitudinal axis X and downstream annular row 16 of unducted blades 18 is fixed. The direction of rotation of blades 18 of upstream annular row 14 is not a determining factor. Downstream annular row 16 can be centered on an axis coincident or not coincident with the longitudinal axis X. As illustrated in FIG. 1, downstream annular row 16 is centered on the longitudinal axis X. Such a configuration of upstream annular row 14 and downstream annular row 16 makes it possible to exploit, through downstream annular row 16, the gyration energy of the air flow coming from upstream annular row 14. The efficiency of turbomachine 10 is thus improved, particularly compared to a single rotating propeller in the case of a conventional turboprop. Upstream annular row 14 of unducted blades 18 is rotated around the longitudinal axis X by turbine(s) 6 which in turn drive compressor(s) 2. Turbomachine 10 generally comprises a reduction gearbox in order to decouple the rotational speed of the turbines 6 from the rotational speed of upstream annular row 14. Furthermore, one of the advantages of a USF type of turbomachine compared to a contra-rotating open rotor type of turbomachine is to reduce the tonal noise emitted by the turbomachine due to the fact that downstream annular row 16 of unducted blades 18 is fixed.

As is schematically illustrated in FIG. 2, turbomachine 10 can have what is referred to as a "puller" configuration (upstream annular row 14 and downstream annular row 16 area located at an upstream end portion of turbomachine 10), or, as schematically illustrated in FIG. 1, a "pusher" configuration (upstream annular row 14 and downstream annular row 16 located at a downstream end portion of turbomachine 10).

In the puller configuration, upstream annular row 14 and downstream annular row 16 can surround a section of compressor(s) 2 of the turbomachine or of the reduction gearbox. In the pusher configuration, upstream annular row 14 and downstream annular row 16 can surround a section of turbine(s) 6 of turbomachine 10.

The absence of a shroud leads to an increase in the noise level emitted by turbomachine 10. Indeed, the noise generated by the annular rows of unducted blades 18 is propagated in the free field. A main cause of the emitted noise is linked to vortex structures 19 generated in the air flow at the free radially outer ends of blades 18 of upstream annular row 14, which impacts blades 18 of downstream annular row 16.

Too high a noise level impacts the comfort of passengers in the aircraft on which the turbomachine is installed. In addition, current standards impose a maximum noise threshold, particularly in areas close to the ground, i.e. during takeoff and landing phases. A known solution for reducing the level of emitted noise consists of uniformly reducing the radial dimension of each blade 18 of downstream annular row 16. Thus, as shown in FIG. 3, the radially outer end of each blade 18 of upstream annular row 14 is inscribed in a first circle 20 centered on the longitudinal axis X, and the radially outer end of each blade 18 of the downstream annular row is inscribed in a second circle 22 centered on the longitudinal axis X, radius $Re_2$ of second circle 22 being less than radius $Re_1$ of first circle 20. In this manner, the impact of vortices 19 formed at the radially outer ends of blades 18 of upstream annular row 14, on blades 18 of downstream annular row 16, is limited in that these vortices pass radially by the outside blades 18 of downstream annular row 16. This solution is called "clipping" or "cropping" or "truncation" of blades 18 of downstream annular row 16.

However, this solution is limited, as reducing the size of blades 18 of downstream annular row 16 causes a reduction in the efficiency of turbomachine 10.

Furthermore, the current solution is not entirely satisfactory, as it allows effective noise reduction only in an isolated configuration of the turbomachine and at a zero angle of incidence. Indeed, the presence of surrounding elements (mast, fuselage, etc.), a non-zero angle of incidence of the air flow perceived by turbomachine 10, and the shape of blades 18 of upstream annular row 14, all modify, on the one hand, the contraction and the axisymmetry around the longitudinal axis X of the air flow downstream of upstream annular row 14, and/or on the other hand, the size of vortices 19 present in the air flow downstream of upstream annular row 14, such that clipping the blades 18 of downstream annular row 16 no longer prevents the interaction between blades 18 of downstream annular row 16 and the vortices 19 formed by blades 18 of upstream annular row 14.

This description aims to propose a solution to these disadvantages.

SUMMARY

At this point, let us immediately clarify that, although the above prior art therefore relates to an open rotor type of turbomachine, the solution of the invention applies to any aeronautical thruster, since the aforementioned problem is not necessarily specific to the aforementioned type of aeronautical thruster. A CROR (contra-rotating open rotor) type of open rotor is not excluded.

In this context, we therefore propose here, and in general, an aeronautical thruster having a longitudinal axis, comprising a hub and at least two annular rows of unducted blades comprising an upstream annular row and a downstream annular row which are spaced apart from each other along said longitudinal axis, the upstream annular row being rotatable around the longitudinal axis, said downstream annular row comprising at least a first blade and a second blade each extending in a radial direction from the hub so as to define a radial dimension between said hub and a radially outer end of the corresponding blade, characterized in that the radial dimension of the first blade is greater than the radial dimension of the second blade.

Such a configuration makes it possible to reduce the impact of vortices formed at the radially outer end of the blades of the upstream annular row, on the second blade of the downstream annular row. In particular, the second blade of the downstream annular row may advantageously be located in a predetermined circumferential zone which is conducive to emitting a significant level of noise. In addition, the radial dimension of the first blade may be greater, in particular regarding the "clipping" solution known from the prior art, thus increasing the performance of the aeronautical thruster without increasing the level of noise emitted by the aeronautical thruster, or even reducing it. In particular, the first blade may be located in a circumferential zone of the downstream annular row which is less conducive to noise emission.

Unlike the known configuration which is adapted for a CROR ("Contra-Rotating Open Rotor") type of aeronautical thruster, the solution has the advantage of being particularly suitable for a USF type of aeronautical thruster.

The term "unducted" used in reference to the upstream annular row and downstream annular row indicates that the blades of the upstream annular row and the blades of the downstream annular row are not surrounded by a nacelle, unlike conventional aeronautical thrusters in which the fan is shrouded inside a nacelle.

The downstream annular row may be fixed around the longitudinal axis. In other words, the blades of the downstream annular row may not be rotatable around the longitudinal axis.

It can be noted that with regard in particular to document US 2017/274993, which has already filed a proposal within the aforementioned general framework, the above solution is non-obvious, in particular due to the fact that US 2017/274993 encourages those skilled in the art to move away from our claimed solution by using an aeronautical thruster in which the upstream annular row and the downstream annular row are both rotated around the axis. Indeed, according to the embodiment of FIG. 13 of US 2017/274993, to obtain a reduction in the noise emitted by the thruster, it appears necessary that the blades of the upstream and downstream annular rows are rotated in the same direction of rotation and that they are in phase alignment (for example see paragraph of US 2017/274993). Consequently, those skilled in the art would not be encouraged to modify the aeronautical thruster described in that embodiment of FIG. 13 in US 2017/274993 so as to have the downstream annular row be fixed around the longitudinal axis and thus would not be oriented towards our claimed solution.

This does not exclude the possibility that the blades of the downstream annular row have variable pitch. The blades of the upstream annular row and/or the downstream annular row can have variable pitch. Each blade can thus be adjusted in rotation around a respective pitch axis which extends radially. It is thus possible to adapt the pitch of the blades of the aeronautical thruster, according to the operation of the aeronautical thruster and the flight phase, to improve aeronautical performance. The hub may also comprise a blade pitch variation system adapted to vary the incidence of the blades around the respective pitch change axis according to the flight phase.

Each blade of the upstream annular row can extend in a radial direction from the hub so as to define a radial dimension between said hub and a radially outer end of the corresponding blade, the dimension of each of the blades of the upstream annular row being greater than the radial dimension of the first blade of the downstream annular row. In other words, the first blade of the downstream annular row can be clipped relative to the blades of the upstream annular row. This limits the impact of the vortices formed at the radially outer end of the blades of the upstream annular row, on the first blade of the downstream annular row and therefore also on the second blade of the downstream annular row. "Clipped blade" is understood to mean that the blade has a reduced radial dimension. Alternatively, it may be provided that at least one blade of the upstream row has a radial dimension greater than the radial dimension of the first blade of the downstream annular row. In another alternative, it may be provided that at least one blade of the upstream annular row has a radial dimension greater than the radial dimension of each of the blades of the downstream annular row.

The radial dimension of a blade is measured between a radially inner end of the blade, this being located at (meaning closest to) the hub of the aeronautical thruster, and a radially outer end of the blade. The radially inner end of a blade may be, longitudinally, at a leading edge of the blade or at the pitch change axis of the blade in question. The radially inner end of a blade is also called the "blade root". An angular position of each blade around the longitudinal axis can be identified by the angular position around the longitudinal axis of the inner end of the corresponding blade. The radially outer end of the blade is the end opposite the radially inner end. The radially outer end of the blade may be the free end of the blade. The radially inner end and the radially outer end of each of the blades may be radially aligned, i.e. at the same longitudinal position. It is possible that the radially inner end and the radially outer end of each of the blades may be longitudinally offset relative to each other.

The first blade and the second blade of the downstream annular row may each have a radially outer radius passing through said radially outer end, the radially outer radius of the first blade being greater than the radially outer radius of the second blade. The radially outer radius of a blade can be considered as the radial distance from the longitudinal axis of the radially outer end point of said blade. In other words, this is the maximum radius of the blade.

The first blade and the second blade may each have a radially inner radius. The radially inner radius of a blade can be considered as the radial distance from the longitudinal axis of the radially inner end of the blade. Each blade may be fixed to the hub of the aeronautical thruster at the radially inner end. Each blade may be fixed to the hub near the leading edge at the blade root, or near the pitch change axis at the blade root.

Each blade of the upstream annular row can have a radially outer radius. A relative difference in the radially outer radius of any among the first blade and second blade of the downstream annular row, in comparison to the radially outer radius of any of the blades of the upstream annular row, may be between −15% and 30%.

The first blade and the second blade of the downstream annular row may be circumferentially consecutive. Alternatively, one (or more) blade(s) may be circumferentially interposed between the first blade and the second blade.

The radially outer end of each of the blades of the upstream annular row is inscribed within an outer envelope of the upstream annular row. Similarly, the radially outer end of each of the blades of the downstream annular row is inscribed within an outer envelope of the downstream annular row. The outer envelope of the upstream annular row may surround the outer envelope of the downstream annular row when they are projected onto a common projection plane which is normal to the longitudinal axis.

A projection of the outer envelope of the upstream annular row onto a plane normal to the longitudinal axis may define a circle centered on the longitudinal axis. The circle defined by the projection of the outer envelope of the upstream annular row onto a plane normal to the longitudinal axis may have a diameter which represents the outside diameter of the aeronautical thruster.

A projection of the outer envelope of the downstream annular row onto a plane normal to the longitudinal axis may define a circle. The center of the circle defined by the projection of the outer envelope of the downstream annular row may be offset from the longitudinal axis in the direction of an axis passing through the angular positions at 12 o'clock and 6 o'clock. In other words, the geometric center of the projection of the outer envelope of the downstream annular row (i.e. the center of the circle if the projection of the outer envelope defines a circle) can be offset from the longitudinal axis in the direction of the axis passing through the angular positions at 12 o'clock and at 6 o'clock. The radial distance between the center of the circle defined by the projection of the outer envelope of the downstream annular row and the longitudinal axis can be between 1/200th and 1/5th of the diameter of the circle defined by the projection of the outer envelope of the upstream annular row.

The hub may have, at the downstream annular row, a cross-section normal to the longitudinal axis which has the shape of a circle centered on the longitudinal axis. The hub may have an opening arranged, in whole or in part, longitudinally between the upstream annular row and the downstream annular row. The opening may be annular around the longitudinal axis. The opening may be intended to form an air inlet for the internal flow of the aeronautical thruster. Also, the radially outer radius of the hub may, at the downstream annular row, be greater than the radially outer radius of the hub at the upstream annular row. The radially outer radius of the hub at the upstream annular row and at the downstream annular row may respectively coincide with the radially inner radius of the blades of the upstream annular row and of the downstream annular row respectively.

The downstream annular row may comprise at least one group of blades having the same radial dimension, including at least a first group comprising a plurality of first blades and/or a second group comprising a plurality of second blades. Alternatively, the downstream annular row may comprise at least one group of blades having the same radially outer radius, including at least a first group comprising a plurality of first blades and/or a second group comprising a plurality of second blades.

The downstream annular row may comprise k groups of blades with k being an integer greater than or equal to 1. The integer k may be less than or equal to the number of blades in the downstream annular row. This thus limits the number of different blades to be manufactured, making it possible to reduce the costs associated with the manufacture of such an aeronautical thruster.

The blades of said at least one group of blades of the downstream annular row may be arranged circumferentially such that they are contiguous within an angular sector around the longitudinal axis. In other words, the blades of each group of blades may all be consecutive, side by side, in said angular sector around the longitudinal axis. The manufacturing costs of the aeronautical thruster are further reduced.

In other words, each group of blades may be associated with at least one angular sector around the longitudinal axis so as to form an angular sector composed of blades from this corresponding group. There therefore may be provided several angular sectors of blades circumferentially adjacent to one another, each angular sector comprising blades having a given radial dimension or a given radially outer radius, that is different from the radial dimension or respectively from the radially outer radius, of the blades of an adjacent sector.

The first blade and the second blade may each be arranged angularly around the longitudinal axis at a respective angle, the angle being measured around the longitudinal axis in a clockwise direction relative to an angular position at 12 o'clock, the radial dimension or the radially outer radius of the first blade and/or the radial dimension or the radially outer radius of the second blade being determined as a function of the respective angle according to a linear, parabolic, logarithmic, or exponential law.

The downstream annular row may comprise at least one set of blades arranged contiguously in an angular sector around the longitudinal axis, said set of blades able to comprise the first blade and/or the second blade, each blade of the set of blades being arranged angularly around the longitudinal axis at a respective angle, the angle being measured around the longitudinal axis in a clockwise direction relative to an angular position at 12 o'clock, each blade of the set of blades having a radial dimension or a radially outer radius determined as a function of the respective angle according to a linear, parabolic, logarithmic, or exponential law. The angular sector associated with said set of blades may extend between the angular position at 12 o'clock and an angular position at 6 o'clock.

The second blade may be angularly positioned, around the longitudinal axis, closer to an angular position at 6 o'clock than the first blade is. Conversely, the first blade may be angularly positioned, around the longitudinal axis, closer to an angular position at 12 o'clock than the second blade is. According to one particular embodiment, the first blade of the downstream annular row may be angularly positioned, around the longitudinal axis, between an angular position at 12 o'clock and an angular position at 6 o'clock, and the second blade may be angularly positioned, around the longitudinal axis, between the first blade and the angular position at 6 o'clock.

This configuration is particularly advantageous for reducing the influence of the vortices formed at the radially outer end of the blades of the upstream annular row on the blades of the downstream annular row when the angle of incidence of the aeronautical thruster is high, i.e. when the longitudinal axis of the aeronautical thruster has a high inclination relative to the horizontal, in particular a positive angle of incidence during takeoff phases.

The downstream annular row may comprise a first angular series of blades centered on the angular position at 6 o'clock and a second angular series of blades centered on the angular position at 12 o'clock, the average radial dimension of the blades of the first angular series being less than the average radial dimension of the blades of the second angular series.

The downstream annular row may comprise at least one pair of blades for which the angular positioning, around the longitudinal axis, is symmetrical relative to a plane of symmetry comprising the longitudinal axis and an axis passing through angular positions at 6 o'clock and at 12 o'clock, the blades of said pair of blades having identical geometric parameters, in particular a same radial dimension. The downstream annular row may be symmetrical relative to the plane of symmetry. It is understood by "symmetrical" that, for each blade of the downstream annular row angularly positioned, around the longitudinal axis, at an angle measured around the longitudinal axis in the clockwise direction relative to the angular position at 12 o'clock and between 0° and 180° exclusive, the downstream annular row comprises another blade angularly positioned around the longitudinal axis at an opposite angle (i.e. the same angle but measured around the longitudinal axis in the counterclockwise direction) and having identical geometric parameters. In particular, the blades of the downstream annular row which are angularly positioned around the longitudinal axis, respectively at opposite angles relative to the 12 o'clock angular position, may have the same radial dimension.

The downstream annular row can have a rotational symmetry of order n where n is an integer greater than or equal to 2. The rotational symmetry corresponds to a discrete rotational symmetry. Thus, an object having a rotational symmetry of order n is invariant for any rotation of 1/nth of a revolution, i.e. for any rotation of an angle of 2π/n. In such a configuration, two circumferentially adjacent blades each have a radial dimension that differs from one another. Thus, each blade has a different acoustic radiation than circumferentially adjacent blades, thus promoting the decorrelation of the noise sources and further reducing the noise generated by the aeronautical thruster.

The downstream annular row may comprise n subsets of blades, each blade of a subset being associated with a group of blades.

The downstream annular row may comprise k*n blades. For example, the downstream annular row may comprise between 2 and 25 blades. The number of blades in the upstream annular row may be different from the number of blades in the downstream annular row. This further minimizes the noise level emitted by the aeronautical thruster.

The solidity of the downstream annular row, defined as the ratio between the chord line and the spacing between two circumferentially consecutive blades in the circumferential direction, can be less than 3 over the entire radial dimension of each blade. In particular, in a preferred embodiment, the solidity is less than 1 at the radially outer end of the blades.

The ratio between the distance in the longitudinal direction between a mid-plane of each angular row which is normal to the longitudinal axis, and the diameter of the aeronautical thruster, may vary between 0.01 and 0.8. The mid-plane normal to the respective longitudinal axis of each annular row may be the plane containing a respective pitch change axis of each of the blades of the corresponding annular row. The trailing edge of each of the blades of the upstream annular row is located longitudinally upstream of a leading edge of each of the blades of the downstream annular row. This thus reduces, or even prevents, interferences between the annular rows of blades.

The upstream annular row and the downstream annular row may be located at an upstream end portion of the aeronautical thruster along the longitudinal direction, or at a downstream end portion of the aeronautical thruster along the longitudinal direction.

The aeronautical thruster may have a "puller" configuration (upstream annular row and downstream annular row which are located at an upstream end portion of the aeronautical thruster), or a "pusher" configuration (upstream annular row and downstream annular row which are located at a downstream end portion of the aeronautical thruster).

In the puller configuration, the upstream annular row and the downstream annular row may surround a section of the compressor(s) or of the reduction gearbox of the aeronautical thruster. In the pusher configuration, the upstream annular row and the downstream annular row may surround a section of the aeronautical thruster's turbine(s).

According to another aspect, a propulsion assembly is described for an aircraft, comprising an aeronautical thruster as described above and an attachment pylon for fixing the aeronautical thruster to the aircraft, the attachment pylon being connected to one of the blades of the downstream annular row so as to form a single aerodynamic assembly.

According to another aspect, an aircraft is described comprising an aeronautical thruster as described above or a propulsion assembly as described above.

BRIEF DESCRIPTION OF DRAWINGS

Other features, details, and advantages will become apparent upon reading the detailed description below, and upon analyzing the appended drawings, in which.

DESCRIPTION OF EMBODIMENTS

Figure 1:
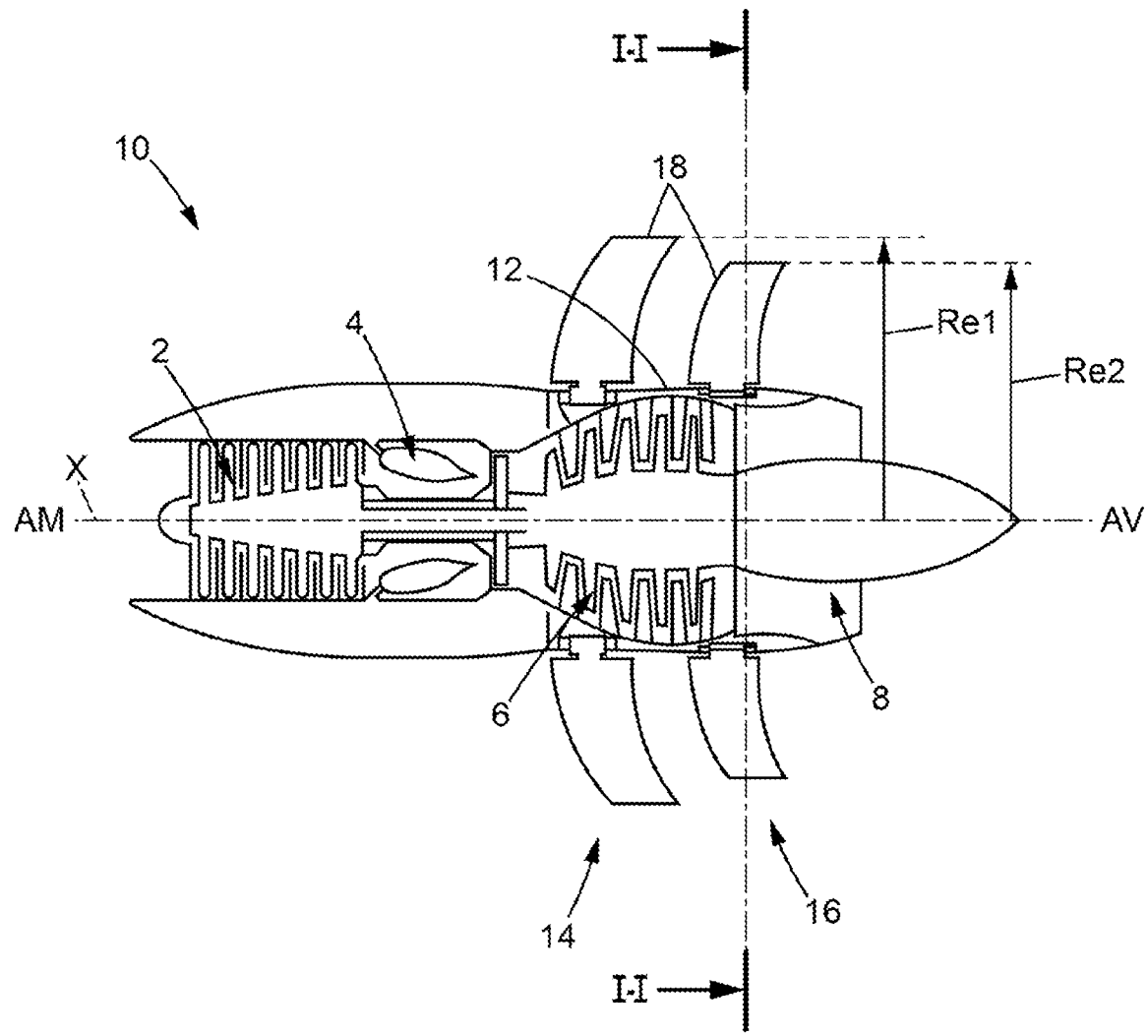
FIG. 1 is a partial schematic section view of a turbomachine with an unducted fan according to the prior art, in a "pusher" configuration.
Figure 2:
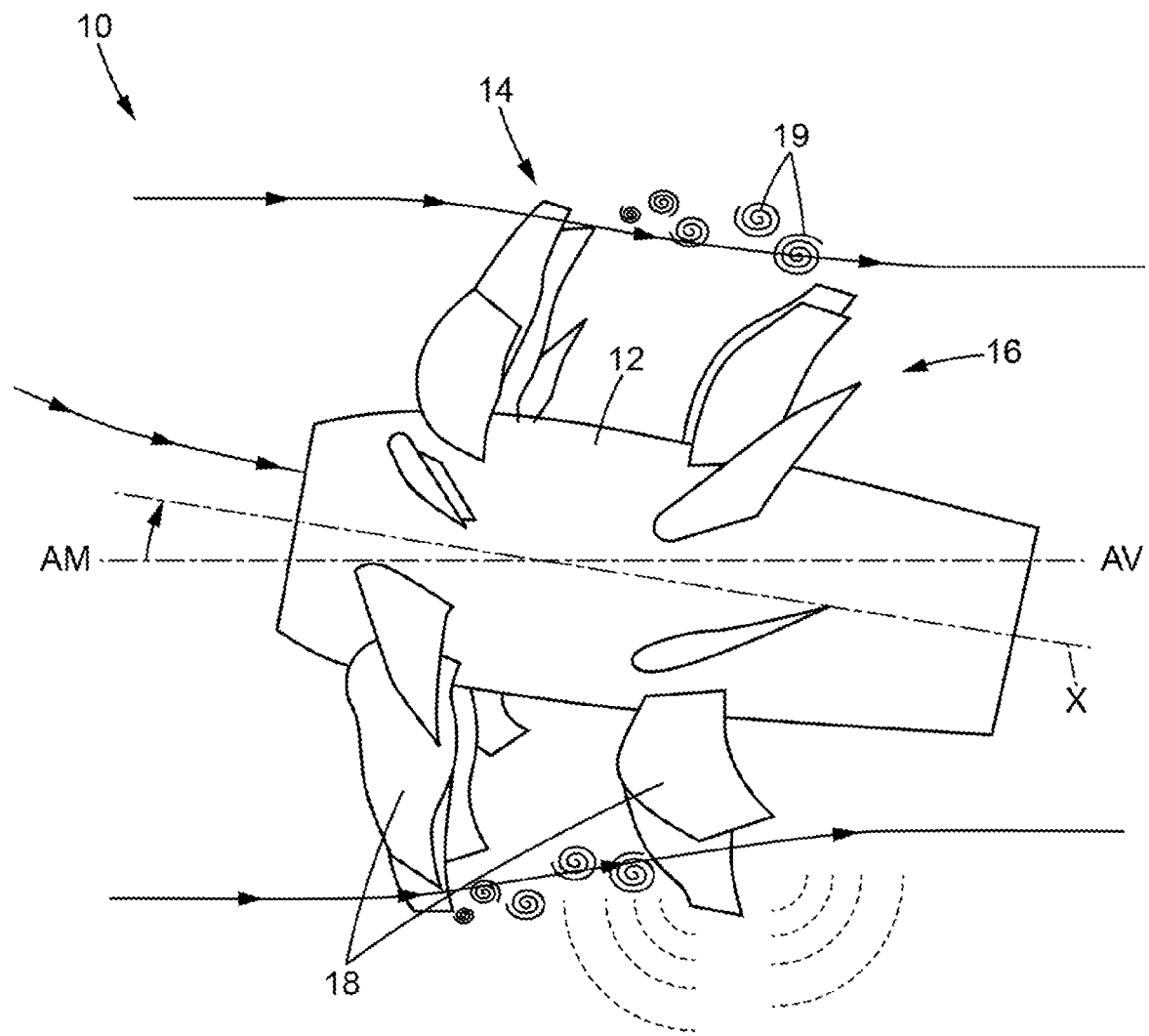
FIG. 2 is a schematic view of a turbomachine with an unducted fan, in a "puller" configuration in a takeoff phase.
Figure 3:
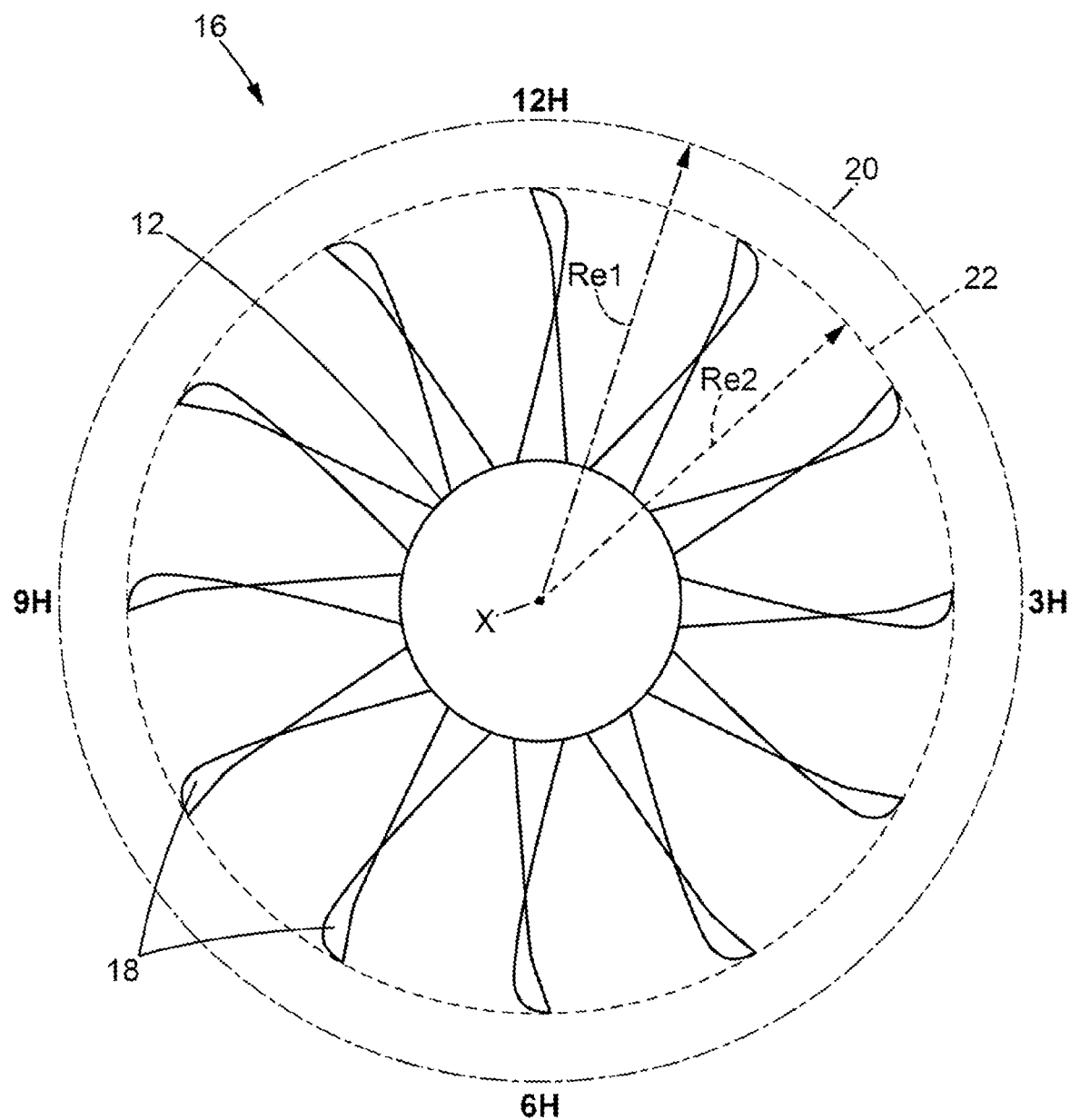
FIG. 3 is a schematic view illustrating an annular row of fixed unducted blades of the turbomachine of FIG. 1 in section plane I-I, according to the prior art.
Figure 4:
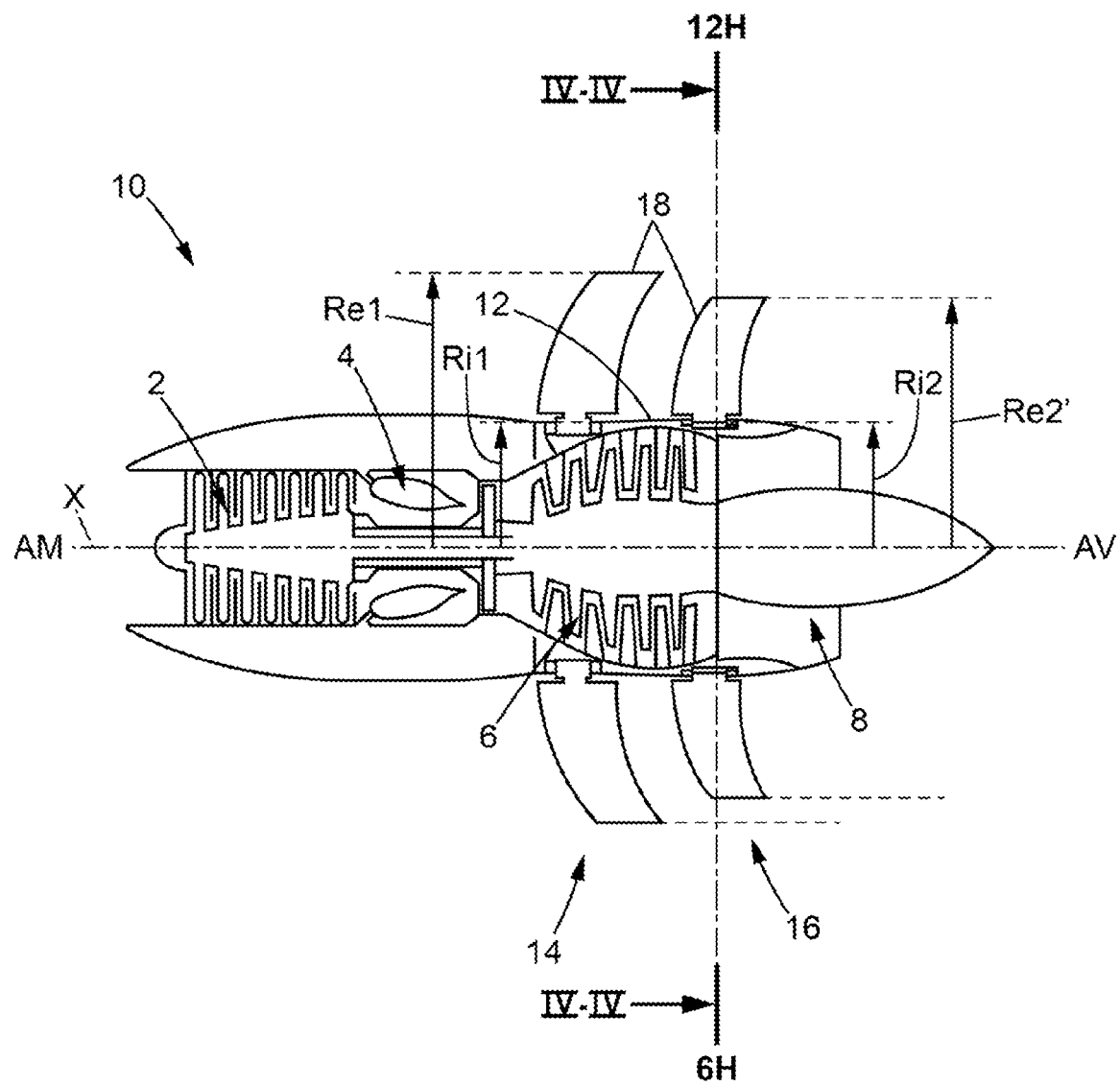
FIG. 4 is a partial schematic section view of a turbomachine with an unducted fan according to this description, in a "pusher" configuration.

Reference is now made to FIG. 4. FIG. 4 shows a section view of a turbomachine 10 of longitudinal axis X which comprises, from upstream to downstream inside the engine casing, one (or more) compressor(s) 2, one (or more) combustion chamber(s) 4, one (or more) turbine(s) 6, and one (or more) exhaust nozzle(s) 8.

Turbomachine 10 comprises a hub 12 and two annular rows of unducted blades 18 in which there is an upstream annular row 14 and a downstream annular row 16. Upstream annular row 14 and downstream annular row 16 are spaced apart one from one another along the longitudinal axis X. Upstream annular row 14 is rotatable around the longitudinal axis X. Here, downstream annular row 16 is fixed around the longitudinal axis X. In other words, downstream annular row 16 is not rotated around the longitudinal axis X. This does not exclude each blade 18 of downstream annular row 16 from being a variable-pitch blade as will be seen further below. Furthermore, according to an alternative not shown, downstream annular row 16 can be rotatable around the longitudinal axis X. In other words, upstream annular row 14 is of the rotor type and downstream annular row 16 here is of the stator type. In the configuration of FIG. 4, upstream annular row 14 of unducted blades 18 is rotated around the longitudinal axis X by turbine(s) 6 which drive compressor(s) 2. In addition, a reduction gearbox (or simply "gearbox") may be provided between turbine(s) 6 and upstream annular row 14. According to one application, the turbomachine can have a thrust of between 1000 and 90,000 pounds, preferably between 2500 and 50,000 pounds in the cruise phase or in the takeoff phase.

Blades 18 of upstream annular row 14 and/or of downstream annular row 16 may be variable-pitched. It is thus possible to adapt the pitch of blades 18 of turbomachine 10 according to the operating point of turbomachine 10 or the flight phase. A pitch change system integrated into the hub may be provided in order to adapt the angle of incidence of the blades for each flight phase. Each blade 18 can thus be rotationally adjusted around a respective pitch change axis according to the flight phases and conditions. The pitch change axis of each of blades 18 is an axis extending radially and positioned longitudinally at a central portion of the corresponding blade. The pitch change axis of each of blades 18 of downstream annular row 16, visible in FIG. 4, is coincident with an axis passing through angular positions at 12 o'clock and 6 o'clock around the longitudinal axis of the downstream annular row.

In the remainder of the description, orientation qualifiers such as "longitudinal", "radial", or "circumferential", are defined in reference to the longitudinal axis X of turbomachine 10. The longitudinal direction corresponds here to the direction of advancement of the turbomachine. In particular, the longitudinal direction can coincide with a horizontal direction, i.e. perpendicular to the gravity field. The relative qualifiers "upstream" and "downstream" are defined relative to each other in reference to the flow of gases in turbomachine 10 in the longitudinal direction. The angular position of each of blades 18 around the longitudinal axis X is identified relative to a clock face (here viewed from upstream for example) in which the angular positions at 12 o'clock, 3 o'clock, 6 o'clock, and 9 o'clock are positioned in the conventional manner. The angular position at 12 o'clock is therefore positioned vertically upwards relative to the longitudinal axis X and the angular position at 6 o'clock is positioned vertically downwards relative to the longitudinal axis X. The angular position at 3 o'clock is positioned horizontally to the right relative to the longitudinal axis X and the angular position at 9 o'clock is positioned horizontally to the left relative to the longitudinal axis X. An axis extending radially and passing through angular positions at 12 o'clock and 6 o'clock is thus perpendicular to an axis extending radially and passing through the angular positions at 3 o'clock and 9 o'clock. Absolute position qualifiers, such as the terms "top", "bottom", "left", "right", etc., or relative position qualifiers, such as the terms "above", "below", "upper", "lower", etc., and orientation qualifiers, such as the terms "vertical" and "horizontal", here refer to the orientation of the figures and are considered during an operational state of turbomachine 10, typically when it is installed on an aircraft set down on the ground. In this state of turbomachine 10, the axis passing through the angular positions at 12 o'clock and at 6 o'clock extends in the direction of the gravity field, i.e. vertically. On the other hand, it can be deduced that a rolling movement of the aircraft in flight on which turbomachine 10 is mounted will be likely to cause a rotation of the vertical and horizontal directions around the longitudinal axis X as considered in the figures. In the same manner, a rolling movement of the aircraft in flight on which turbomachine 10 is mounted will be likely to cause a rotation of the axis passing through the angular positions at 12 o'clock and 6 o'clock and of the axis passing through the angular positions at 3 o'clock and at 9 o'clock around the longitudinal axis X. A "side area" of turbomachine 10 refers to an area which is circumferentially in the vicinity of the angular position at 3 o'clock or the angular position at 9 o'clock. Similarly, an "upper area" and a "lower area" of turbomachine 10 respectively refer to an area which is circumferentially in the vicinity of the angular position at 12 o'clock and to an area which is circumferentially in the vicinity of the angular position at 6 o'clock.

Each blade 18 of upstream annular row 14 and of downstream annular row 16 extends in a radial direction from hub 12 so as to define a radial dimension between said hub 12 and a radially outer end of the corresponding blade 18. In other words, the radial dimension of a blade 18 is measured between a radially inner end of blade 18 and a radially outer end of blade 18. The radially inner end of each blade 18 is located at hub 12 of turbomachine 10. Each blade 18 may in particular be fixed to hub 12 of turbomachine 10 at the radially inner end. Here, the radially outer end of each blade 18 is a free end (i.e. unducted).

In addition, each blade 18 of upstream annular row 14 and of downstream annular row 16 has a radially inner radius, respectively Ri1, Ri2, considered as the radial distance at the longitudinal axis X of the radially inner end of blade 18, for example located at (i.e. closest to) the hub of the turbomachine. The radially inner end is, in FIG. 4, close to the pitch change axis of the corresponding blade. The radially inner end of each blade may alternatively be close to the leading edge at the blade root. A radially outer radius Re of each blade 18 is considered to be the radial distance from the longitudinal axis X of the radially outer end of said blade 18, i.e. the maximum radius of the blade.

Figure 5:
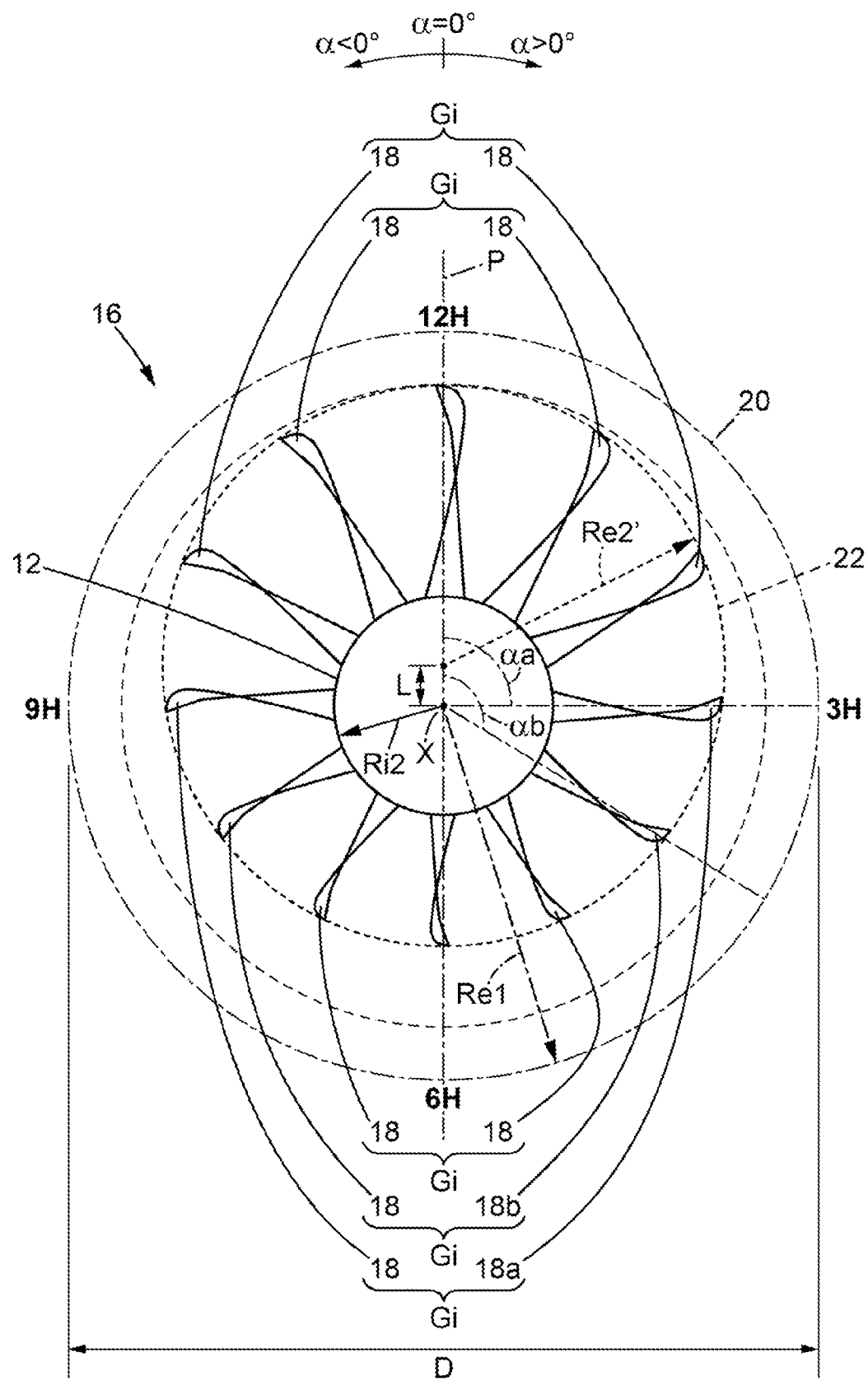
FIG. 5 is a schematic view illustrating an annular row of fixed unducted blades of the turbomachine of FIG. 4 in section plane IV-IV, according to a first embodiment of this description.

As can be seen in FIG. 5 which shows the turbomachine of FIG. 4 in the section plane IV-IV normal to the longitudinal axis X, the radially outer end of blades 18 of upstream annular row 14 and of downstream annular row 16 are respectively inscribed in an outer envelope 20 of upstream annular row 14 and an outer envelope 22 of downstream annular row 16. Here, a projection of outer envelope 20 of upstream annular row 14 onto section plane IV-IV defines a circle of radius Re1, or of diameter D, centered on the longitudinal axis X. Diameter D of the projection of outer envelope 20 of upstream annular row 14 onto section plane IV-IV can represent the outside diameter of turbomachine 10.

On the other hand, the radial dimension of each blade 18 of downstream annular row 16 is less than the radial dimension of each of the blades 18 of upstream annular row 14. In particular, the radially outer radius of each blade 18 of downstream annular row 16 is less than the radially outer radius of each of the blades 18 of upstream annular row 14. Thus, outer envelope 20 of upstream annular row 14 surrounds outer envelope 22 of downstream annular row 16 when these are projected onto a common projection plane which here is section plane IV-IV perpendicular to the longitudinal axis X. Each blade 18 of downstream annular row 16 therefore has clipping relative to blades 18 of upstream annular row 14 so as to limit the impact of vortices 19 formed at the radially outer end of blades 18 of upstream annular row 14. In other words, each blade 18 of downstream annular row 16 is clipped relative to blades 18 of upstream annular row 14.

FIG. 5 shows a first embodiment of downstream annular row 16, in which the projection of outer envelope 22 of downstream annular row 16 onto section plane IV-IV defines a circle whose center is offset relative to the longitudinal axis X in the direction of the axis passing through the angular positions at 12 o'clock and at 6 o'clock. The radial distance between the center of outer envelope 22 of downstream annular row 16, in circular form, and the longitudinal axis X may be between 0.005 D and 0.2 D. The circle defined by outer envelope 22 of downstream annular row 16 has a radius Re2' that is less than radius Re1 of outer envelope 20 of upstream annular row 14.

Thus, in the first embodiment as shown in FIG. 5, downstream annular row 16 is such that it comprises at least a first blade 18a and a second blade 18b where the radial dimension of second blade 18b is less than the radial dimension of first blade 18a. Second blade 18b here has a radially outer radius that is less than the radially outer radius of each of blades 18 of upstream annular row 14. First blade 18a here also has a radially outer radius that is less than the radially outer radius of each of blades 18 of upstream annular row 14.

FIG. 5 illustrates, among blades 18 of downstream annular row 16, a particular combination of first blade 18a and second blade 18b in which first blade 18a and second blade 18b are circumferentially consecutive. However, it is not excluded that other combinations of first blade 18a and second blade 18b as described above are possible. In particular, the first blade 18a and second blade 18b in question may not be circumferentially consecutive.

Such a configuration of downstream annular row 16 allows greater clipping of second blade 18b of downstream annular row 16, to further reduce the interaction of vortices 19 formed at the radially outer end of blades 18 of upstream annular row 14 with second blade 18b of downstream annular row 16. In particular, this greater clipping of second blade 18b of downstream annular row 16 can be applied in predetermined circumferential areas which are conducive to emitting a significant level of noise. Furthermore, first blade 18a of downstream annular row 16 has a larger radial dimension than second blade 18b, i.e. less clipping, thus increasing the performance of turbomachine 10.

According to another noteworthy aspect of the first embodiment, second blade 18b is angularly positioned, around the longitudinal axis X, closer to the angular position at 6 o'clock than first blade 18a is. In particular, first blade 18a and second blade 18b may be determined such that regardless of the angular position of first blade 18a between the angular position at 12 o'clock and the angular position at 6 o'clock, second blade 18b is angularly positioned, around the longitudinal axis X, between first blade 18a and the angular position at 6 o'clock. Here again, FIG. 5 illustrates, among blades 18 of downstream annular row 16, one particular combination of first blade 18a and second blade 18b that is in accordance with the arrangements described above. However, it is not excluded that other combinations are possible for first blade 18a and second blade 18b in accordance with the arrangements described above.

Blades 18 of the lower portion of downstream annular row 16 therefore have greater clipping than blades 18 of the upper portion of downstream annular row 16. Blade 18 of downstream annular row 16 having the minimum radial dimension is angularly located, around the longitudinal axis X, at (or close to) the angular position at 6 o'clock. Conversely, blade 18 of downstream annular row 16 having the maximum radial dimension is angularly located, around the longitudinal axis X, at (or close to) the angular position at 12 o'clock. There may also be defined a first angular series of blades 18 centered on the angular position at 6 o'clock and a second angular series of blades 18 centered on the angular position at 12 o'clock, the average radial dimension of blades 18 of the first angular series being less than the average radial dimension of blades 18 of the second angular series.

This further reduces the impact of the vortices formed at the radially outer end of blades 18 of upstream annular row 14 on blades 18 of the lower portion of downstream annular row 16. In addition, the configuration of downstream annular row 16 of the first embodiment makes it possible to maintain a radial dimension of blades 18 of the upper portion of downstream annular row 16 that is adapted to improve the performance of turbomachine 10.

This configuration is particularly advantageous for reducing the impact of vortices 19 formed at the radially outer end of blades 18 of upstream annular row 14, on blades 18 of downstream annular row 16, when the angle of incidence of turbomachine 10 is high, i.e. when the longitudinal axis X has a high inclination relative to the horizontal, in particular a positive angle of incidence during takeoff phases.

A relative difference in the radially outer radius of any of blades 18 of downstream annular row 16 in comparison to the radially outer radius of any of blades 18 of upstream annular row 14 is preferably less than 30%. The relative difference of the radially outer radius of any of blades 18 of downstream annular row 16 in comparison to the radially outer radius of any of blades 18 of upstream annular row 14 is defined by (Re1−Re2')/Re1*100, where Re2' is the radially outer radius of any of blades 18 of downstream annular row 16 and Re1 is the radially outer radius of any of blades 18 of upstream annular row 14. In particular, a relative difference in the radially outer radius of blade 18 of downstream annular row 16 having the maximum radial dimension, in comparison to the radially outer radius of any of blades 18 of upstream annular row 14, is preferably between 2% and 18%. A relative difference in the radially outer radius of blade 18 of downstream annular row 16 having the minimum radial dimension, in comparison to the radially outer radius of blade 18 of downstream annular row 16 having the maximum radial dimension, is less than 12%, preferably less than 2%, more preferably less than 1%.

Each blade 18 of downstream annular row 16 is arranged angularly around the longitudinal axis X at an angle α, the angle α being measured around the longitudinal axis X in the clockwise direction relative to an angular position at 12 o'clock. In other words, angle α is equal to 0° for an angular position at 12 o'clock and equal to 180° for the angular position at 6 o'clock. The angular position of each blade 18 around the longitudinal axis X can be identified by a pitch change axis of the corresponding blade, here coincident with a stack axis of the corresponding blade. Also, equivalently in the example of FIG. 5, the angular position of each blade 18 around the longitudinal axis X can be identified by the angular position around the longitudinal axis X of the inner end of the corresponding blade 18.

For example, first blade 18a and second blade 18b are each arranged angularly around the longitudinal axis X at a respective angle αa, αb. In the embodiment of FIG. 5, the radial dimension of each blade 18 of downstream annular row 16 is determined as a function of angle α of the corresponding blade according to a uniform and monotonically decreasing law for an angle α varying from 0° to 180°. Alternatively, it could be a linear, parabolic, logarithmic, or exponential law.

Furthermore, in the example shown, each blade 18 of downstream annular row 16 has the same radially inner radius Ri2. This is due to the fact that hub 12 is axisymmetric around the longitudinal axis X at downstream annular row 16. In other words, hub 12 has, at downstream annular row 16, a cross-section normal to the longitudinal axis which has the shape of a circle centered on the longitudinal axis X. Thus, first blade 18a of downstream annular row 16 has a radial dimension greater than the radial dimension of second blade 18b only in that the radially outer radius of first blade 18a is greater than the radially outer radius of second blade 18b.

Downstream annular row 16 here is symmetrical relative to a plane of symmetry P comprising the longitudinal axis X and the axis passing through the angular positions at 12 o'clock and at 6 o'clock. It is understood by "symmetrical" that, for each blade 18 of downstream annular row 16 angularly positioned, around the longitudinal axis X, at an angle α measured around the longitudinal axis in the clockwise direction relative to the angular position at 12 o'clock and comprised between 0° and 180° exclusive, downstream annular row 16 comprises another blade 18 angularly positioned, around the longitudinal axis X, at an angle −α and having identical geometric parameters. In particular, blades 18 of downstream annular row 16 which are angularly positioned respectively at an angle α and −α around the longitudinal axis X, can have the same radial dimension. We therefore have a plurality of groups Gi comprising two identical blades 18 which are angularly arranged respectively at an angle α and −α, around the longitudinal axis X.

According to a variant of the first embodiment of FIG. 5, the projection of outer envelope 22 of downstream annular row 16 onto section plane IV-IV can have any shape that is symmetrical relative to plane of symmetry P, for example an oval shape or an ovoid shape having plane P as its plane of symmetry.

The number of blades 18 of upstream annular row 14 may be different from the number of blades 18 of downstream annular row 16. This makes it possible to further reduce the level of noise emitted by turbomachine 10. For example, downstream annular row 16 may comprise between 2 and 25 blades 18.

The solidity of the downstream annular row 16, defined as the ratio between the chord line and the spacing in the circumferential direction between two circumferentially consecutive blades 18, can be less than 3 over the entire radial dimension of each blade 18. In particular, in a preferred embodiment, the solidity is less than 1 at the radially outer end of blades 18.

The ratio between the distance in the longitudinal direction between a mid-plane normal to the respective longitudinal axis X of each annular row, and diameter D of turbomachine 10, can vary between 0.01 and 0.8. The mid-plane normal to the respective longitudinal axis X of each annular row 14, 16 is the plane containing the pitch change axis of each of the blades of the corresponding annular row 14, 16. The trailing edge of each of blades 18 of upstream annular row 14 here is located longitudinally upstream of a leading edge of each of blades 18 of downstream annular row 16. Interferences between the upstream and downstream annular rows 14, 16 are thus reduced or even avoided.

Figure 6:
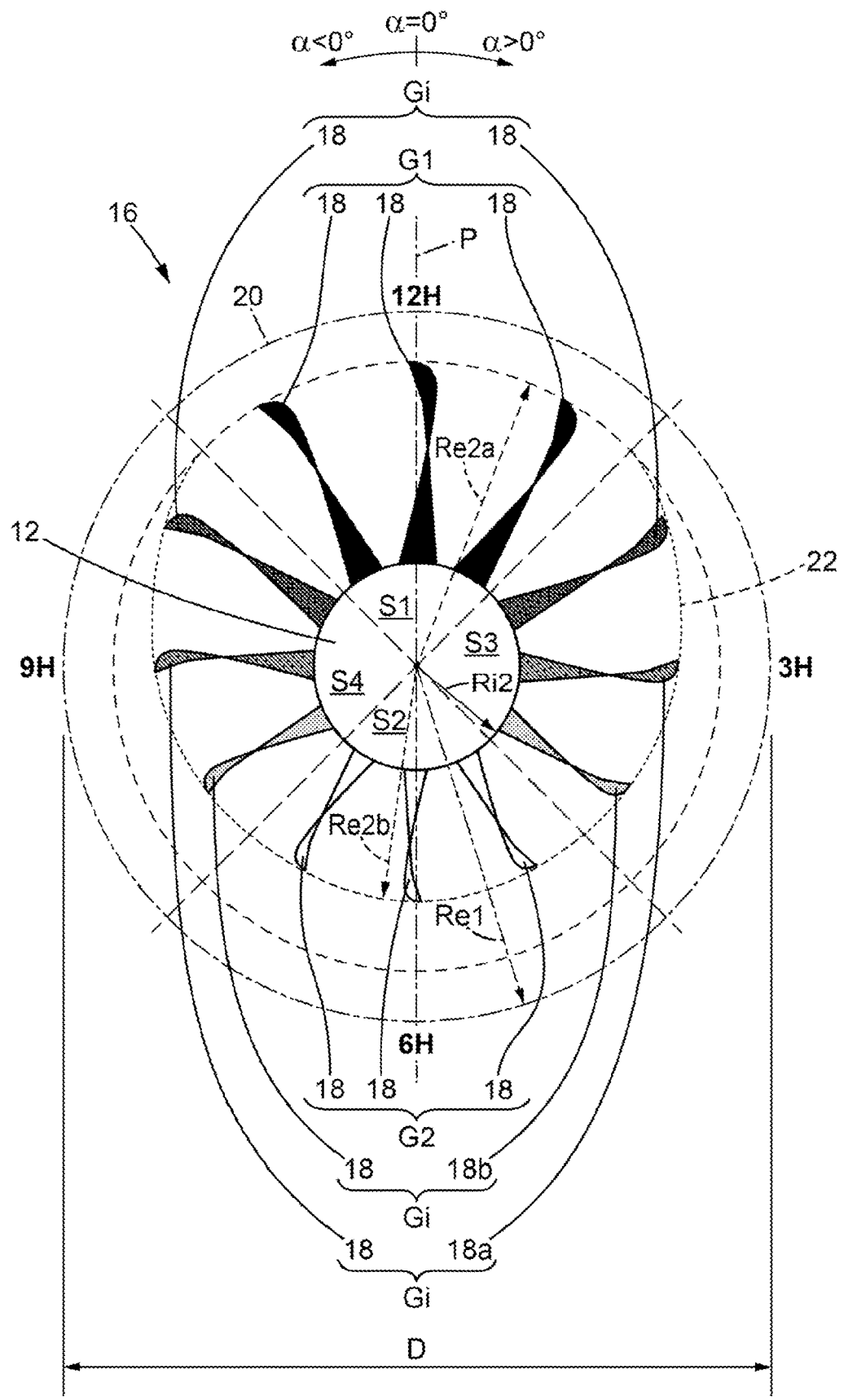
FIG. 6 is a schematic view illustrating an annular row of fixed unducted blades of the turbomachine of FIG. 4 in section plane IV-IV, according to a second embodiment of this description.

FIG. 6 shows a second embodiment of downstream annular row 16 which differs from the first embodiment in that downstream annular row 16 comprises a first group G1 of blades 18 and a second group G2 of blades 18. Each of blades 18 of first group G1 of blades 18, respectively of second group G2 of blades 18, has the same radial dimension. Blades 18 of each of first and second groups G1, G2 are arranged circumferentially in a contiguous manner within an angular sector around the longitudinal axis X. This limits the number of different blades 18 to be manufactured, making it possible to reduce the costs associated with the manufacture of such a turbomachine 10. Of course, the number of groups of blades 18 is not limited to 2. Downstream annular row 16 may comprise k group(s) of blades 18, with k being an integer greater than or equal to 1.

In the embodiment of FIG. 6, each of first group G1 of blades 18 and of second group G2 of blades 18 is associated with at least one angular sector around the longitudinal axis X in a manner that forms an angular sector composed of blades 18 of the corresponding group G1, G2. First group G1 of blades 18 here is associated with a first angular sector S1 centered on the angular position at 12 o'clock. Second group G2 of blades 18 is associated with a second angular sector S2 centered on the angular position at 6 o'clock. First angular sector S1 and second angular sector S2 here each extend over 90° in the example shown. Downstream annular row 16 further comprises a plurality of groups Gi of blades 18 comprising two identical blades 18 which are arranged angularly around the longitudinal axis X, respectively at an angle $\alpha$ and an angle $-\alpha$. One of the two blades 18 of each group Gi is angularly positioned, around the longitudinal axis X, in a third angular sector S3 centered on the angular position at 3 o'clock, and the other of the two blades 19 is angularly positioned, around the longitudinal axis X, in a fourth angular sector S4 centered on the angular position at 9 o'clock. Third angular sector S3 and fourth angular sector S4 here also extend over 90°. Alternatively, angular sectors S1, S2, S3, S4 may extend independently of each other over angular ranges that are greater or less than 90°.

Blades 18 of first group G1 of blades 18 have a radial dimension greater than the radial dimension of blades 18 of second group G2 of blades 18. In the present case, blades 18 of first group G1 have a radially outer radius that is greater than the radially outer radius of blades 18 of second group G2. The projection of outer envelope 22 of downstream annular row 16 onto section plane IV-IV here has an ovoid shape. Indeed, the projection of outer envelope 22 of downstream annular row 16 onto section plane IV-IV has a first arc portion of a circle of radius Re2$a$ at first angular sector S1 and a second arc portion of a circle of radius Re2$b$ at second angular sector S2. Radius Re2$a$ of the first portion is greater than radius Re2$b$ of the second portion.

Furthermore, blades 18 of downstream annular row 16 which are arranged, around the longitudinal axis X, in each of third angular sector S3 and fourth angular sector S4, respectively form a set of blades whose radial dimension and/or or radially outer radius of each blade 18 is determined as a function of the angle $\alpha$ of the angular positioning of the corresponding blade 18 around the longitudinal axis X. The radial dimension and/or the radially outer radius can be determined according to a uniform and monotonic law for an angle $\alpha$ varying within a range of values respectively corresponding to third angular sector S3 and to fourth angular sector S4. Alternatively, it could be a linear, parabolic, logarithmic, or exponential law. It is noteworthy that said law may be chosen so that the calculated radially outer radius is equal to Re2$a$ for an angle $\alpha$ corresponding to the boundary between first angular sector S1 and third angular sector S3, or respectively between first angular sector S1 and fourth angular sector S4. Similarly, said law may be chosen so that the calculated radially outer radius is equal to Re2$b$ for an angle $\alpha$ corresponding to the boundary between second angular sector S2 and third angular sector S3, or respectively the boundary between second angular sector S2 and fourth angular sector S4.

Figure 7:
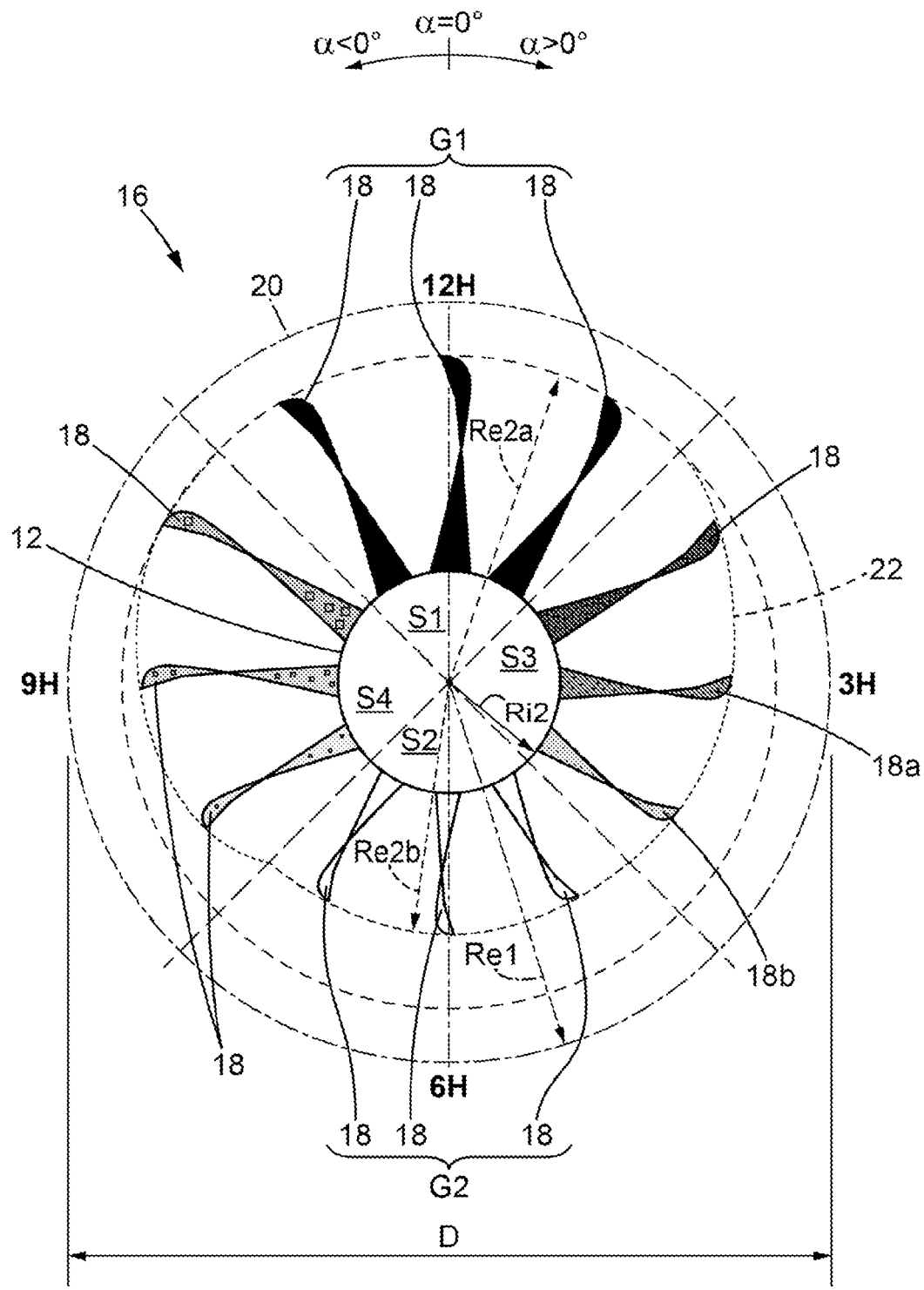
FIG. 7 is a schematic view illustrating an annular row of fixed unducted blades of the turbomachine of FIG. 4 in section plane IV-IV, according to a third embodiment of this description.

FIG. 7 shows a third embodiment of downstream annular row 16 which differs from the second embodiment of FIG. 6 in that downstream annular row 16 is not symmetrical relative to plane of symmetry P. Indeed, a pair of blades 18 of downstream annular row 16 which are angularly positioned, around the longitudinal axis X, respectively in third angular sector S3 and fourth angular sector S4, at an angle $\alpha$ and an angle $-\alpha$, are not identical. In particular, a pair of blades 18 of downstream annular row 16 that are angularly positioned, around the longitudinal axis X, respectively in third angular sector S3 and fourth angular sector S4, at an angle $\alpha$ and an angle $-\alpha$, have a radial dimension that differs from one another. This embodiment makes it possible to take into account installation effects, and in particular the relative position of the fuselage, which could have an influence on the positioning of the flow pipe or draft tube generated by upstream annular row 14, or on the effects of ascending and descending blades of upstream annular row 14, which can modify the load of blades 18 of upstream annular row 14 and of downstream annular row 16, as well as the level of clipping necessary in the third and fourth angular sectors S3 and S4 of downstream annular row 16. The radial dimension of each blade 18 arranged in the third and fourth angular sectors S3 and S4 can be determined according to different laws, depending on the angular sector in question.

Figure 8:
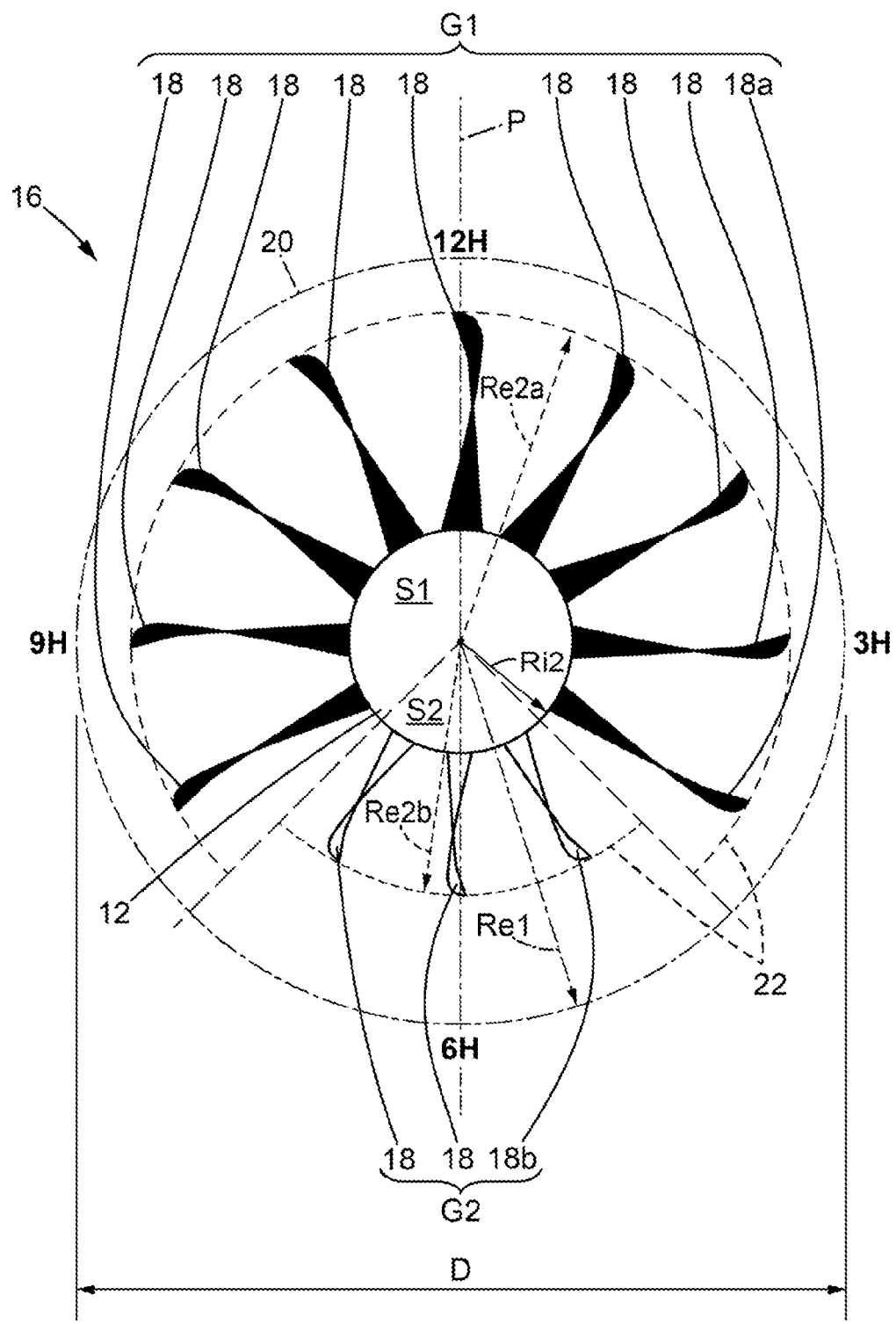
FIG. 8 is a schematic view illustrating an annular row of fixed unducted blades of the turbomachine of FIG. 4 in section plane IV-IV, according to a fourth embodiment of this description.

FIG. 8 shows a fourth embodiment of downstream annular row 16, in which downstream annular row 16 comprises only first group G1 of blades 18 and second group G2 of blades 18. First angular sector S1 associated with first group G1 of blades 18 is centered on the angular position at 12 o'clock and extends over 260°. Second angular sector S2 associated with second group G2 of blades 18 is centered on the angular position at 6 o'clock and extends over 100°.

Figure 9:
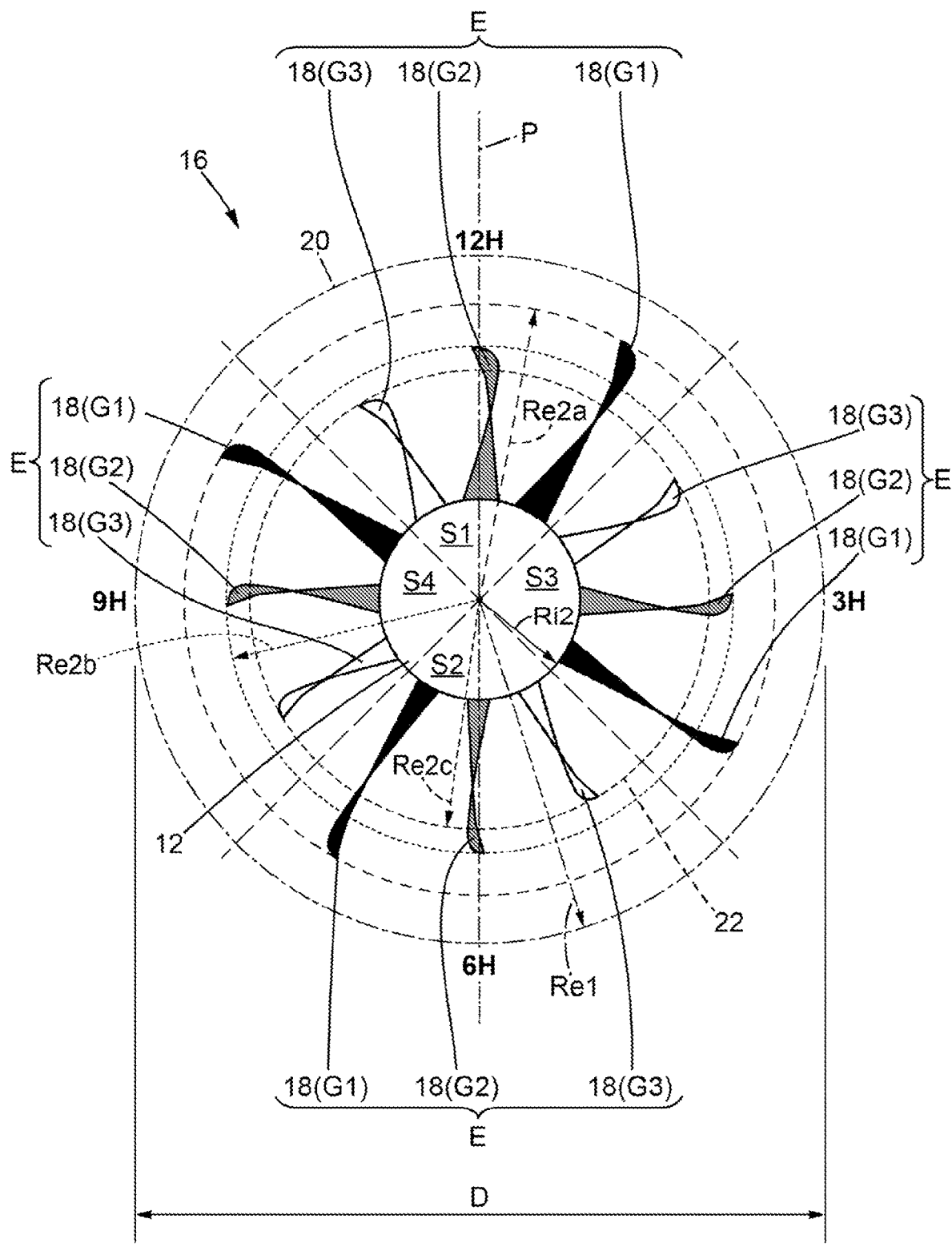
FIG. 9 is a schematic view illustrating an annular row of fixed unducted blades of the turbomachine of FIG. 4 in section plane IV-IV, according to a fifth embodiment of this description.

FIG. 9 shows a fifth embodiment of downstream annular row 16 in which downstream annular row 16 has a rotational symmetry of order 4. Downstream annular row 16 thus comprises four subassemblies E of blades 18, each blade 18 of a subassembly being associated with a group of blades 18. Each blade 18 thus has a different acoustic radiation than circumferentially adjacent blades 18, promoting the decorrelation of noise sources. In the fifth embodiment of FIG. 9, downstream annular row 16 comprises a first group G1 of blades 18, a second group G2 of blades 18, and third group G3 of blades 18. Thus, each subset E of blades 18 comprises a first blade 18(G1), a second blade 18(G2), and a third blade 18(G3), respectively associated with first group G1, second group G2, and third group G3.

Here too, the rotational symmetry of downstream annular row 16 is not limited to an order of 4. Downstream annular row 16 can have a rotational symmetry of order n where n is an integer greater than or equal to at 2. Downstream annular row 16 can therefore have n subsets E of blades 18. As seen above, downstream annular row 16 can comprise k groups of blades with k being an integer greater than or equal to 1, k being equal to 3 in the embodiment of FIG. 9. Downstream annular row 16 can therefore comprise k*n blades. Here, downstream annular row 16 comprises 12 blades in the embodiment of FIG. 9.

Figure 10:
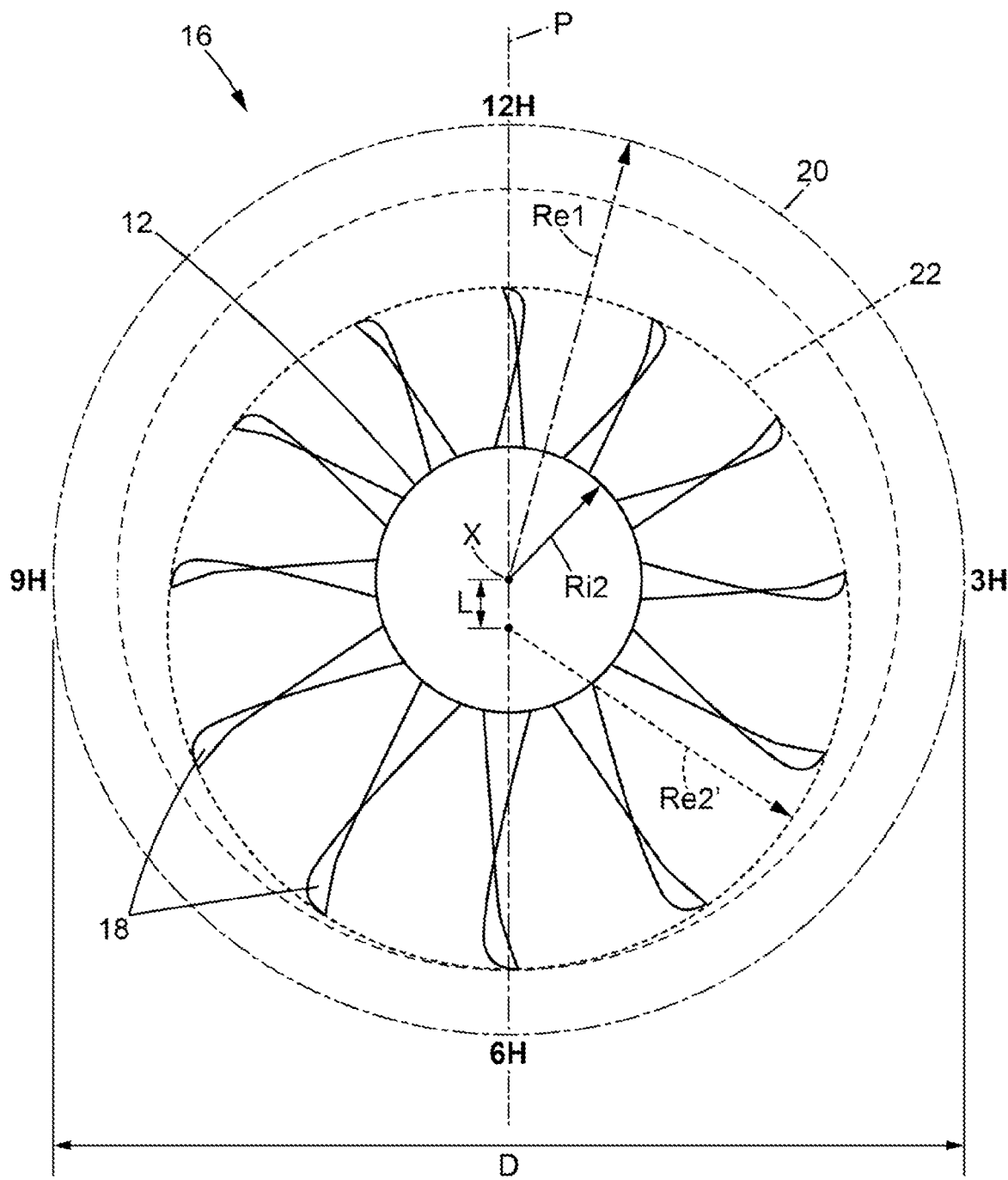
FIG. 10 is a schematic view illustrating an annular row of fixed unducted blades of the turbomachine of FIG. 4 in section plane IV-IV, according to a sixth embodiment of this description.

According to a sixth embodiment shown in FIG. 10, blades 18 of the upper portion of downstream annular row 16 have greater clipping than blades 18 of the lower portion of downstream annular row 16. This configuration makes it possible to reduce the impact of vortices formed at the radially outer ends of blades 18 of upstream annular row 14 on blades 18 of the upper portion of downstream annular row 16, in particular during landing phases or to avoid effects linked to the installation of turbomachine 10 in an aircraft. This configuration could allow reducing the level of noise emitted by turbomachine 10 during the landing phases and/or when turbomachine 10 is installed at the rear of the aircraft.

Figure 11:
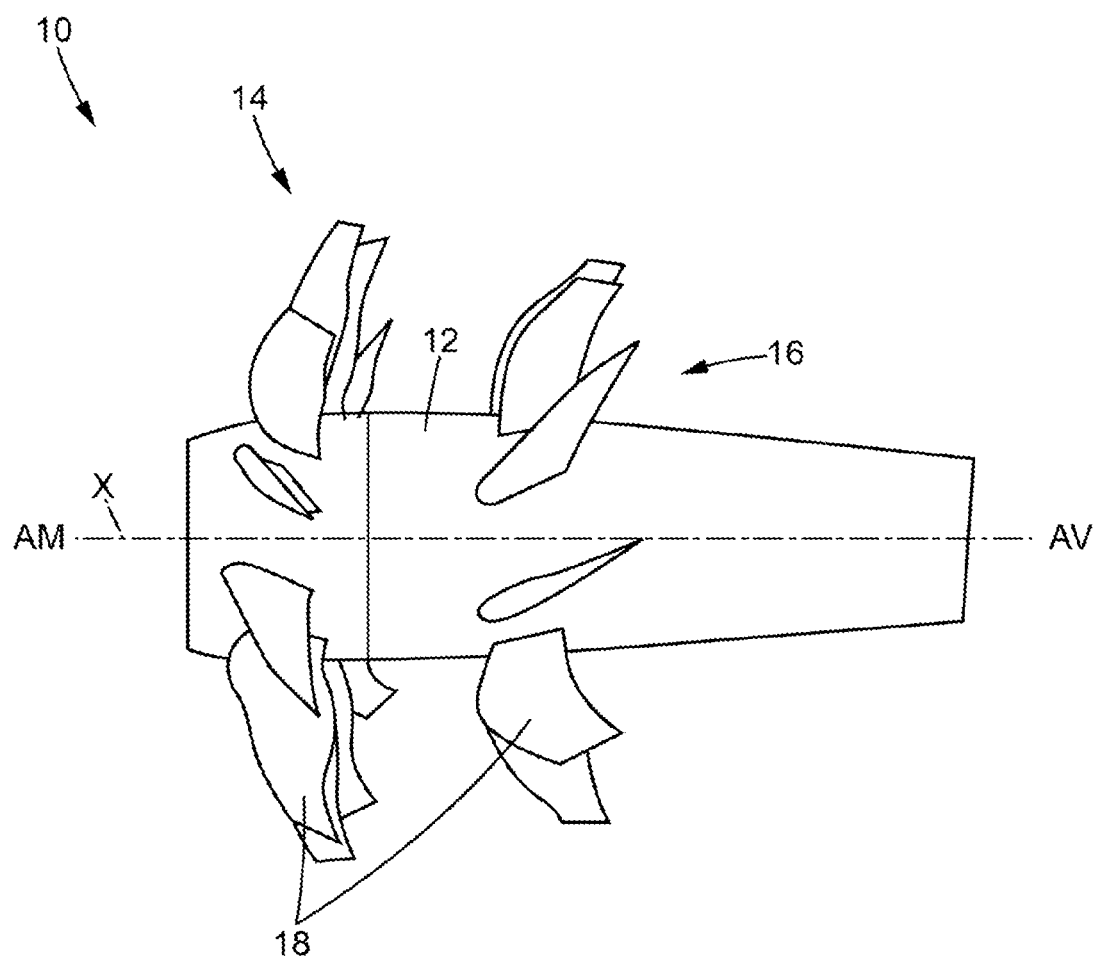
FIG. 11 is a schematic view of a turbomachine with an unducted fan of this description, in a "puller" configuration.

For each embodiment, upstream annular row 14 and downstream annular row 16 may be located at an upstream end portion of turbomachine 10 along the longitudinal direction, as in the example turbomachine 10 shown in FIG. 11. Turbomachine 10 has, in this case, a "puller" configuration. In particular, upstream annular row 14 and downstream annular row 16 may surround a section of compressor(s) or of the reduction gearbox of turbomachine 10.

Alternatively, as shown in FIG. 4, upstream annular row 14 and downstream annular row 16 may be located at a downstream end portion of turbomachine 10 along the longitudinal direction. Turbomachine 10 is then in a "pusher" configuration. Upstream annular row 14 and downstream annular row 16 may surround a section of turbine(s) of turbomachine 10.

The invention is not limited to the examples described above and is capable of numerous variants.

Figure 12:
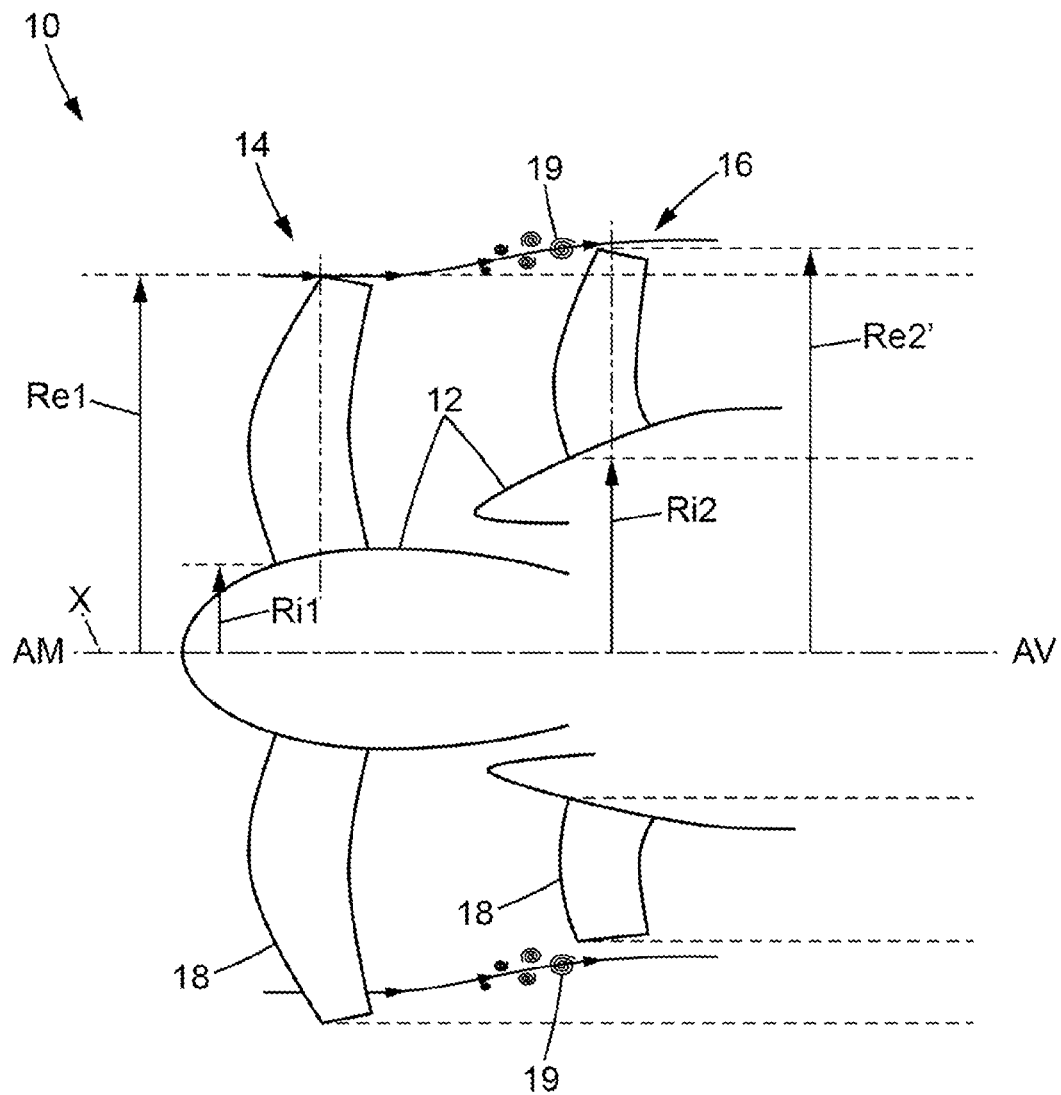
FIG. 12 is a schematic view of a turbomachine with an unducted fan of this description, according to an alternative embodiment.

According to a variant shown in FIG. 12, although the radial dimension of each blade 18 of downstream annular row 16 is less than the radial dimension of each of blades 18 of upstream annular row 14, it may be provided that one or more blades 18 of downstream annular row 16 has a radially outer radius that is greater than the radially outer radius of each of blades 18 of upstream annular row 14. A relative difference in the radially outer radius of this blade 18 of downstream annular row 16, Re2', relative to the radially outer radius of any of blades 18 of upstream annular row 14, Re1, meaning (Re1−Re2')/Re1*100, is preferably between −15% and 0%.

As a result, this (these) blade(s) 18 of downstream annular row 16 has a radially inner radius that is greater than the radially inner radius of each of blades 18 of upstream annular row 14. This may be due to the fact that hub 12 has a larger radially outer radius at downstream annular row 16 than at upstream annular row 14. In other words, hub 12 may have a shape that flares in the downstream direction. Due to the path or the contraction of the streamlines of the air flow circulating around hub 12 of turbomachine 10, vortices 19 formed at the radially outer end of each of blades 18 of upstream annular row 14 do not impact blades 18 of downstream annular row 16, even though the latter have a radially outer radius that is greater than the radially outer radius of each of blades 18 of upstream annular row 14.

Figure 13:
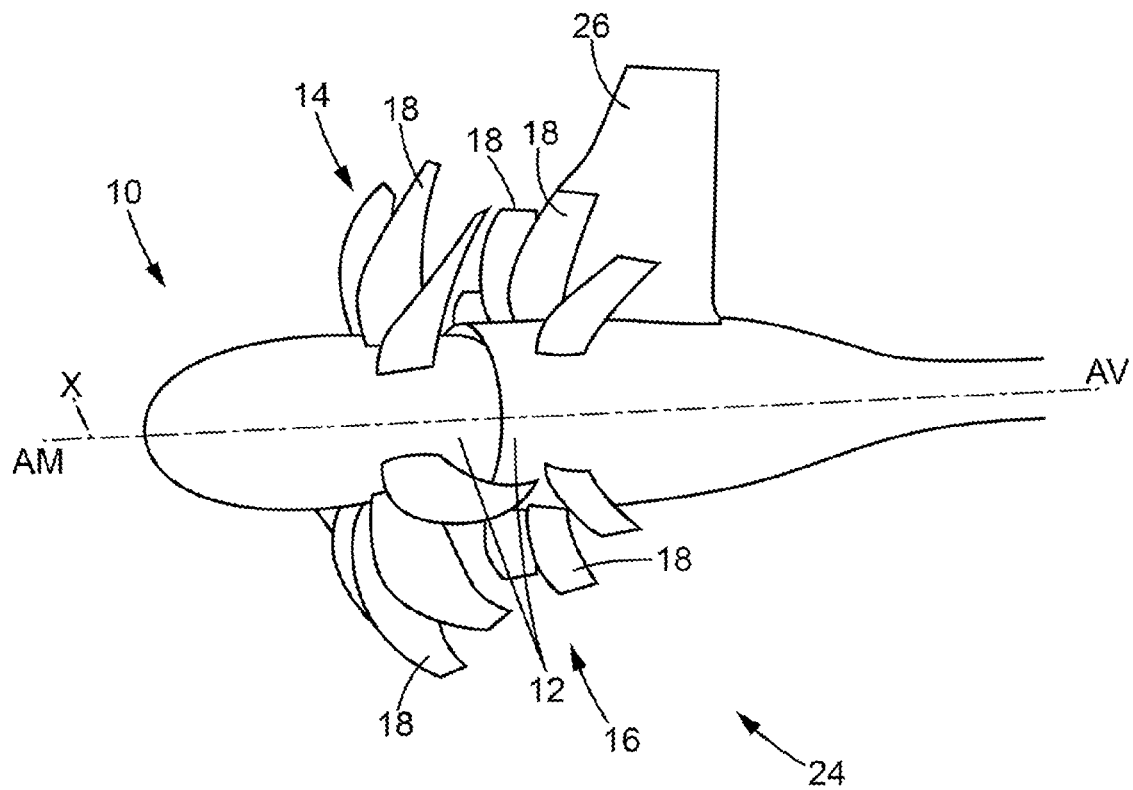
FIG. 13 is a schematic view of a turbomachine with an unducted fan of this description, according to another alternative embodiment.

FIG. 13 shows another variant. FIG. 13 shows a propulsion assembly 24 for an aircraft. Propulsion assembly 24 comprises a turbomachine 10 as described above and an attachment pylon 26 for fixing turbomachine 10 to the aircraft. The attachment pylon is connected to one of blades 18 of downstream annular row 16 so as to form a single aerodynamic assembly. For this purpose, attachment pylon 26 may be connected to one of blades 18 of downstream annular row 16 as a continuation of its material. In other words, attachment pylon 26 may be made as integral with the material of one of blades 18 of downstream annular row 16. Alternatively, attachment pylon 26 may be connected to one of blades 18 of downstream annular row 16 by means of one (or more) attachment means(s). Attachment pylon 26 also has an aerodynamic profile similar to an aerodynamic profile of blades 18 of downstream annular row 16. Attachment pylon 26 therefore has the same effect on the air flow coming from upstream annular row 14 as blades 18 of downstream annular row 16. Such an arrangement makes it possible to further reduce the noise emitted by turbomachine 10.

Figure 14:
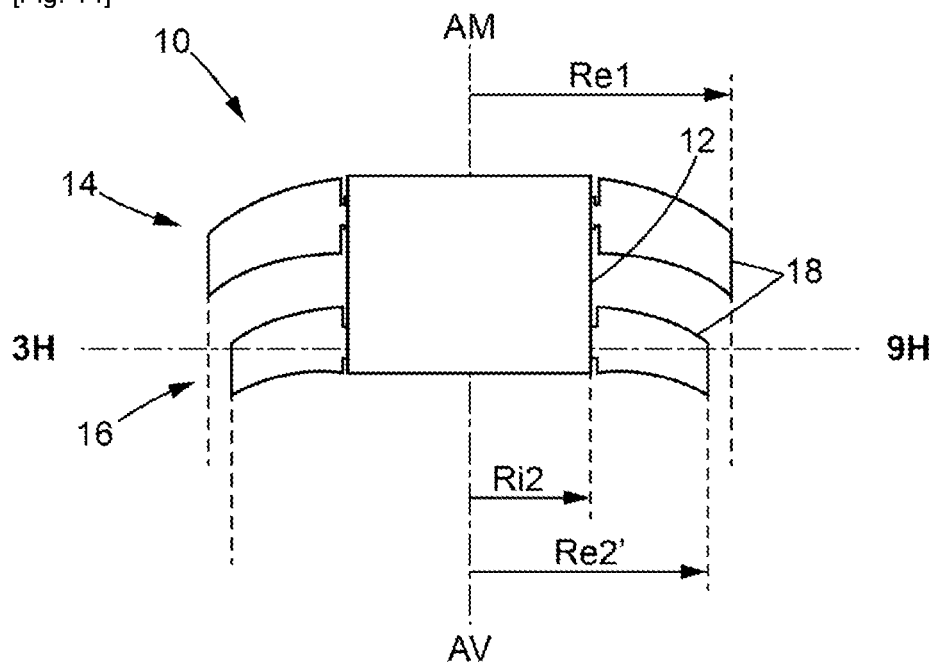
FIG. 14 shows a schematic view of any aeronautical thruster according to this description.

As already noted, any solution among those above can also be applied to an aeronautical thruster other than those presented as non-limiting examples in the figures, for example an electric, hydrogen, or hybrid thruster. In this context, FIG. 14 schematically illustrates an aeronautical thruster therefore comprising, around blades 18, the two upstream 14 and downstream 16 annular rows, coaxial with the longitudinal axis X.

The invention claimed is:

1. An aeronautical thruster having a longitudinal axis, comprising:
a hub; and
at least two annular rows of unducted blades having an upstream annular row and a downstream annular row which are spaced apart from each other along the longitudinal axis, the upstream annular row being rotatable around the longitudinal axis, the downstream annular row comprising a series of blades including a first blade and a second blade each extending in a radial direction from the hub to define a radial dimension between the hub and a radially outer end of the corresponding blade, wherein the radial dimension of the first blade is greater than the radial dimension of the second blade,
wherein each blade of the upstream annular row has a radially outer radius, and wherein a relative difference in the radially outer radius of any among the first blade and the second blade of the downstream annular row in comparison to the radially outer radius of any of the blades of the upstream annular row is between −15% and 30%.

2. The aeronautical thruster according to claim 1, wherein the downstream annular row is fixed around the longitudinal axis.

3. The aeronautical thruster according to claim 1, wherein the first blade and the second blade of the downstream annular row each have a radially outer radius defined by the radially outer end of the corresponding blade, the radially outer radius of the first blade being greater than the radially outer radius of the second blade.

4. The aeronautical thruster according to claim 1, wherein the first blade and the second blade of the downstream annular row are circumferentially consecutive.

5. The aeronautical thruster according to claim 1, wherein each blade of the upstream annular row extends in a radial direction from the hub to define a radial dimension between the hub and a radially outer end of the corresponding blade, the radial dimension of each of the blades of the upstream annular row being greater than the radial dimension of the first blade of the downstream annular row.

6. The aeronautical thruster according to claim 1, wherein the radially outer ends of the blades of the downstream annular row are inscribed within an outer envelope whose projection onto a plane normal to the longitudinal axis defines a circle.

7. The aeronautical thruster according to claim 6, wherein the center of the circle is offset relative to the longitudinal axis.

8. The aeronautical thruster according to claim 1, wherein the downstream annular row comprises at least one group of blades having the same radial dimension, including at least a first group comprising a plurality of first blades and/or a second group comprising a plurality of second blades.

9. The aeronautical thruster according to claim 8, wherein the blades of the at least one group of blades are arranged circumferentially such that they are contiguous within an angular sector around the longitudinal axis.

10. The aeronautical thruster according to claim 1, wherein the first blade and the second blade are each arranged angularly around the longitudinal axis at a respective angle, the angle being measured clockwise around the longitudinal axis relative to an angular position at 12 o'clock, the radial dimension or the radially outer radius of the first blade and/or the radial dimension or the radially outer radius of the second blade being determined as a function of the respective angle, according to a linear, parabolic, logarithmic, or exponential law.

11. The aeronautical thruster according to claim 1, wherein the downstream annular row comprises at least one set of blades arranged contiguously in an angular sector around the longitudinal axis, each blade of the set of blades being arranged angularly around the longitudinal axis at a respective angle, the angle being measured around the longitudinal axis in a clockwise direction relative to an angular position at 12 o'clock, each blade of the set of blades having a radial dimension or a radially outer radius determined as a function of the respective angle according to a linear, parabolic, logarithmic, or exponential law.

12. The aeronautical thruster according to claim 11, wherein the angular sector associated with the set of blades extends between the angular position at 12 o'clock and an angular position at 6 o'clock.

13. The aeronautical thruster according to claim 1, wherein the second blade is angularly positioned around the longitudinal axis closer to an angular position at 6 o'clock than the first blade.

14. The aeronautical thruster according to claim 1, wherein the downstream annular row comprises at least one pair of blades for which the angular positioning around the longitudinal axis is symmetrical relative to a plane of symmetry comprising the longitudinal axis and the axis passing through angular positions at 6 o'clock and at 12 o'clock, and wherein the blades of the pair of blades have the same radial dimension.

15. The aeronautical thruster according to claim 1, wherein the downstream annular row has a rotational symmetry of order n where n is an integer greater than or equal to 2.

16. The aeronautical thruster according to claim 1, wherein the upstream annular row and the downstream annular row are located at an upstream end portion of the aeronautical thruster along the longitudinal direction, or at a downstream end portion of the aeronautical thruster along the longitudinal direction.

17. A propulsion assembly for an aircraft, comprising:
an aeronautical thruster according to claim 1; and
an attachment pylon for fixing the aeronautical thruster to the aircraft, the attachment pylon being connected to one of the blades of the downstream annular row to form a single aerodynamic assembly.

18. An aeronautical thruster having a longitudinal axis, comprising:
a hub; and
at least two annular rows of unducted blades having an upstream annular row and a downstream annular row which are spaced apart from each other along the longitudinal axis, the upstream annular row being rotatable around the longitudinal axis, the downstream annular row comprising a series of blades including a first blade and a second blade each extending in a radial direction from the hub to define a radial dimension between the hub and a radially outer end of the corresponding blade, wherein the radial dimension of the first blade is greater than the radial dimension of the second blade,
wherein the radially outer ends of the blades of the downstream annular row are inscribed within an outer envelope whose projection onto a plane normal to the longitudinal axis defines a circle.

19. An aeronautical thruster having a longitudinal axis, comprising:
a hub; and
at least two annular rows of unducted blades having an upstream annular row and a downstream annular row which are spaced apart from each other along the longitudinal axis, the upstream annular row being rotatable around the longitudinal axis, the downstream annular row comprising a series of blades including a first blade and a second blade each extending in a radial direction from the hub to define a radial dimension between the hub and a radially outer end of the corresponding blade, wherein the radial dimension of the first blade is greater than the radial dimension of the second blade,
wherein the first blade and the second blade are each arranged angularly around the longitudinal axis at a respective angle, the angle being measured clockwise around the longitudinal axis relative to an angular position at 12 o'clock, the radial dimension or the radially outer radius of the first blade and/or the radial dimension or the radially outer radius of the second blade being determined as a function of the respective angle, according to a linear, parabolic, logarithmic, or exponential law.

* * * * *